(12) United States Patent
Derelöv

(10) Patent No.: US 11,371,542 B2
(45) Date of Patent: Jun. 28, 2022

(54) SET OF PANELS

(71) Applicant: Välinge Innovation AB, Viken (SE)

(72) Inventor: Peter Derelöv, Helsingborg (SE)

(73) Assignee: VALINGE INNOVATION AB, Viken (SE)

( * ) Notice: Subject to any disclaimer, the term of this patent is extended or adjusted under 35 U.S.C. 154(b) by 415 days.

(21) Appl. No.: 16/220,574

(22) Filed: Dec. 14, 2018

(65) Prior Publication Data
US 2019/0195256 A1 Jun. 27, 2019

(30) Foreign Application Priority Data

Dec. 22, 2017 (SE) .................................... 1751626-1

(51) Int. Cl.
F16B 12/20 (2006.01)

(52) U.S. Cl.
CPC .... F16B 12/2027 (2013.01); *F16B 2012/209* (2013.01)

(58) Field of Classification Search
CPC .............. F16B 12/2009; F16B 12/2027; F16B 2012/209; F16B 5/008; A47B 2230/06; Y10S 403/12
See application file for complete search history.

(56) References Cited

U.S. PATENT DOCUMENTS

| 291,032 A | 1/1884 | Cleland |
| 634,581 A | 10/1899 | Miller |
| 701,000 A | 5/1902 | Ahrens |
| 861,911 A | 7/1907 | Stewart |
| 881,673 A | 3/1908 | Ellison |
| 1,533,099 A | 4/1925 | Carroll |
| 1,534,468 A | 4/1925 | Shea, Jr. |

(Continued)

FOREIGN PATENT DOCUMENTS

| AT | 400 611 B | 2/1996 |
| CH | 365 507 A | 11/1962 |

(Continued)

OTHER PUBLICATIONS

U.S. Appl. No. 16/564,438, Hans Brännström, Agne Pålsson and Peter Derelöv, filed Sep. 9, 2019 (Cited herein as US Patent Application Publication No. 2020/0003242 A1 of Jan. 2, 2020).

(Continued)

*Primary Examiner* — Matthew R McMahon
(74) *Attorney, Agent, or Firm* — Buchanan Ingersoll & Rooney P.C.

(57) ABSTRACT

A method, a locking device and a set of panels, including a panel and an adjacent panel, wherein the panel includes a groove and at least one hole connected to the groove via an opening, the adjacent panel includes a first edge that is configured to be arranged in the groove of the panel, and the panel includes a locking device configured to lock the first edge of the adjacent panel in the groove of the panel, wherein the locking device includes a cylinder and a lever connected to the cylinder, the cylinder is configured to be arranged in the hole in the panel, the cylinder is an eccentric cylinder including a top and bottom base and a locking surface connecting the top and bottom base, the cylinder is configured to act as a cam when the cylinder is turned about an axis in the hole.

25 Claims, 8 Drawing Sheets

(56) References Cited

U.S. PATENT DOCUMENTS

| | | | |
|---|---|---|---|
| 1,800,386 | A | 4/1931 | Hoffman |
| 1,800,387 | A | 4/1931 | Greist |
| 1,802,245 | A | 4/1931 | Foretich |
| 1,954,242 | A | 4/1934 | Heppenstall |
| 2,360,451 | A | 10/1944 | Stone |
| 2,362,904 | A | 11/1944 | Kramer |
| 2,496,184 | A | 1/1950 | Von Canon |
| 2,681,483 | A | 6/1954 | Morawetz |
| 3,002,630 | A | 10/1961 | Heisser |
| 3,195,968 | A | 7/1965 | Freeman |
| 3,284,152 | A | 11/1966 | Schörghuber |
| 3,313,054 | A | 4/1967 | Madey |
| 3,347,610 | A | 10/1967 | Pilliod |
| 3,410,441 | A | 11/1968 | Rhyne |
| 3,722,704 | A | 3/1973 | Piretti |
| 3,722,971 | A | 3/1973 | Zeischegg |
| 3,742,807 | A | 7/1973 | Manning |
| 3,765,465 | A | 10/1973 | Gulistan |
| 3,784,271 | A | 1/1974 | Schreiber |
| 3,884,002 | A | 5/1975 | Logie |
| 3,885,845 | A | 5/1975 | Krieks |
| 3,981,118 | A | 9/1976 | Johnson et al. |
| 4,089,614 | A | 5/1978 | Harley |
| 4,099,293 | A | 7/1978 | Pittasch |
| 4,099,887 | A | 7/1978 | Mackenroth |
| 4,116,510 | A | 9/1978 | Franco |
| 4,142,271 | A | 3/1979 | Busse |
| 4,211,379 | A | 7/1980 | Morgan et al. |
| 4,222,544 | A | 9/1980 | Crowder |
| 4,279,397 | A | 7/1981 | Larsson |
| 4,299,067 | A | 11/1981 | Bertschi |
| 4,308,961 | A | 1/1982 | Kunce |
| 4,324,517 | A | 4/1982 | Dey |
| 4,403,886 | A | 9/1983 | Haeusler |
| 4,405,253 | A | 9/1983 | Stockum |
| 4,509,648 | A | 4/1985 | Govang |
| 4,593,734 | A | 6/1986 | Wallace |
| 4,595,105 | A | 6/1986 | Gold |
| 4,597,122 | A | 7/1986 | Handler |
| 4,615,448 | A | 10/1986 | Johnstonbaugh |
| 4,629,076 | A | 12/1986 | Amstutz et al. |
| 4,750,794 | A | 6/1988 | Vegh |
| 4,752,150 | A | 6/1988 | Salice |
| 4,756,637 | A * | 7/1988 | Walz ............... F16B 12/2027 403/231 |
| 4,813,726 | A * | 3/1989 | Ravinet ............ A47B 95/00 292/204 |
| 4,815,908 | A | 3/1989 | Duran et al. |
| 4,817,900 | A | 4/1989 | Whittington et al. |
| 4,844,266 | A | 7/1989 | Small et al. |
| 4,883,331 | A | 11/1989 | Mengel |
| 4,886,326 | A | 12/1989 | Kuzyk |
| 4,888,933 | A | 12/1989 | Guomundsson |
| 4,891,897 | A | 1/1990 | Gieske et al. |
| 4,909,581 | A | 3/1990 | Haheeb |
| 4,938,625 | A | 7/1990 | Matsui |
| 4,944,416 | A | 7/1990 | Petersen et al. |
| 4,961,295 | A | 10/1990 | Kosch, Sr. et al. |
| 5,004,116 | A | 4/1991 | Cattarozzi |
| 5,018,323 | A | 5/1991 | Clausen |
| 5,109,993 | A | 5/1992 | Hutchison |
| 5,114,265 | A | 5/1992 | Grisley |
| 5,121,578 | A | 6/1992 | Holz |
| 5,125,518 | A | 6/1992 | Ward |
| 5,138,803 | A | 8/1992 | Grossen |
| 5,209,556 | A | 5/1993 | Anderson |
| 5,212,925 | A | 5/1993 | McClinton |
| 5,299,509 | A | 4/1994 | Ballard |
| 5,360,121 | A | 11/1994 | Sothman |
| 5,375,802 | A | 12/1994 | Branham, II |
| 5,423,155 | A | 6/1995 | Bauer |
| 5,451,102 | A | 9/1995 | Chuan |
| 5,458,433 | A | 10/1995 | Stastny |
| 5,471,804 | A | 12/1995 | Winter, IV |
| 5,475,960 | A | 12/1995 | Lindal |
| 5,499,667 | A | 3/1996 | Nakanishi |
| 5,499,886 | A | 3/1996 | Short et al. |
| 5,507,331 | A | 4/1996 | Nakanishi |
| 5,527,103 | A | 6/1996 | Pittman |
| 5,536,108 | A | 7/1996 | Kvalheim |
| 5,658,086 | A | 8/1997 | Brokaw et al. |
| 5,711,115 | A | 1/1998 | Wirt |
| 5,775,521 | A | 7/1998 | Tisbo |
| 5,810,505 | A | 9/1998 | Henriott |
| 5,893,617 | A | 4/1999 | Lee |
| 5,941,026 | A | 8/1999 | Eisenreich |
| 5,944,294 | A | 8/1999 | Baer |
| 5,950,389 | A | 9/1999 | Porter |
| 6,045,290 | A | 4/2000 | Nocievski |
| 6,050,426 | A | 4/2000 | Leurdijk |
| 6,142,436 | A | 11/2000 | Thurston et al. |
| 6,312,186 | B1 | 11/2001 | Röck et al. |
| 6,349,507 | B1 | 2/2002 | Muellerleile |
| 6,363,645 | B1 | 4/2002 | Hunter |
| 6,413,007 | B1 | 7/2002 | Lambright |
| 6,418,683 | B1 | 7/2002 | Martensson |
| 6,491,172 | B2 | 12/2002 | Chance |
| 6,505,452 | B1 | 1/2003 | Hannig |
| 6,547,086 | B1 | 4/2003 | Harvey |
| 6,578,498 | B1 | 6/2003 | Draudt et al. |
| 6,675,979 | B2 | 1/2004 | Taylor |
| D486,676 | S | 2/2004 | Campbell et al. |
| 6,769,219 | B2 | 8/2004 | Schwitte et al. |
| 6,772,890 | B2 | 8/2004 | Campbell et al. |
| 6,827,028 | B1 | 12/2004 | Callaway |
| 6,971,614 | B2 | 12/2005 | Fischer et al. |
| 7,127,860 | B2 | 10/2006 | Pervan |
| 7,223,045 | B2 | 5/2007 | Migli |
| 7,228,977 | B2 | 6/2007 | Perkins et al. |
| 7,300,120 | B2 | 11/2007 | Shin |
| 7,451,535 | B2 | 11/2008 | Wells et al. |
| 7,451,578 | B2 | 11/2008 | Hannig |
| 7,584,583 | B2 | 9/2009 | Bergelin et al. |
| 7,614,350 | B2 | 11/2009 | Tuttle et al. |
| 7,621,092 | B2 | 11/2009 | Groeke et al. |
| 7,641,414 | B1 | 1/2010 | Joyce |
| 7,717,278 | B2 | 5/2010 | Kao |
| 7,721,503 | B2 | 5/2010 | Pervan et al. |
| 7,793,450 | B2 | 9/2010 | Chasmer et al. |
| 7,818,939 | B2 | 10/2010 | Bearinger |
| 7,998,549 | B2 | 8/2011 | Susnjara |
| 8,033,074 | B2 | 10/2011 | Pervan |
| 8,038,363 | B2 | 10/2011 | Hannig |
| 8,042,311 | B2 | 10/2011 | Pervan |
| 8,146,754 | B2 | 4/2012 | Apgood |
| 8,220,217 | B2 | 7/2012 | Muehlebach |
| 8,234,830 | B2 | 8/2012 | Pervan |
| 8,365,499 | B2 | 2/2013 | Nilsson et al. |
| 8,387,327 | B2 | 3/2013 | Pervan |
| 8,464,408 | B2 | 6/2013 | Hazzard |
| 8,495,849 | B2 | 7/2013 | Pervan |
| 8,505,257 | B2 | 8/2013 | Boo et al. |
| 8,544,230 | B2 | 10/2013 | Pervan |
| 8,596,013 | B2 | 12/2013 | Boo |
| 8,602,227 | B1 | 12/2013 | McDonald |
| 8,615,952 | B2 | 12/2013 | Engström |
| 8,713,886 | B2 | 5/2014 | Pervan |
| 8,745,952 | B2 | 6/2014 | Perra |
| 8,764,137 | B2 | 7/2014 | Fehre |
| 8,776,473 | B2 | 7/2014 | Pervan |
| 8,833,028 | B2 | 9/2014 | Whispell et al. |
| 8,864,407 | B1 | 10/2014 | Sorum |
| 8,882,416 | B2 | 11/2014 | Baur et al. |
| 8,887,466 | B2 | 11/2014 | Håkansson et al. |
| 9,175,703 | B2 | 11/2015 | Maertens |
| 9,216,541 | B2 | 12/2015 | Boo |
| 9,290,948 | B2 | 3/2016 | Cappelle et al. |
| 9,375,085 | B2 | 6/2016 | Derelöv |
| 9,538,842 | B2 | 1/2017 | Håkansson et al. |
| 9,655,442 | B2 | 5/2017 | Boo et al. |
| 9,700,157 | B2 | 7/2017 | Keyvanloo |
| 9,714,672 | B2 | 7/2017 | Derelöv et al. |
| 9,723,923 | B2 | 8/2017 | Derelöv |
| 9,726,210 | B2 | 8/2017 | Derelöv et al. |

(56) References Cited

U.S. PATENT DOCUMENTS

| | | |
|---|---|---|
| 9,745,756 B2 | 8/2017 | Hannig |
| 9,758,973 B2 | 9/2017 | Segaert |
| 9,763,528 B2 | 9/2017 | Lung |
| 9,781,997 B2 * | 10/2017 | Maertens ............. A47B 47/042 |
| 9,809,983 B2 | 11/2017 | Trudel |
| 9,945,121 B2 | 4/2018 | Derelöv |
| 10,034,541 B2 | 7/2018 | Boo et al. |
| 10,202,996 B2 | 2/2019 | Håkansson et al. |
| 10,378,570 B2 | 8/2019 | Broughton |
| 10,415,613 B2 | 9/2019 | Boo |
| 10,448,739 B2 | 10/2019 | Derelöv et al. |
| 10,451,097 B2 | 10/2019 | Brännström et al. |
| 10,486,245 B2 | 11/2019 | Fridlund |
| 10,506,875 B2 | 12/2019 | Boo et al. |
| 10,544,818 B2 | 1/2020 | Fridlund |
| 10,548,397 B2 | 2/2020 | Derelöv et al. |
| 10,669,716 B2 | 6/2020 | Derelöv |
| 10,670,064 B2 | 6/2020 | Derelöv |
| 10,724,564 B2 | 7/2020 | Derelöv |
| 10,731,688 B2 | 8/2020 | Brännström et al. |
| 10,736,416 B2 | 8/2020 | Derelöv et al. |
| 10,830,266 B2 | 11/2020 | Fridlund |
| 10,830,268 B2 | 11/2020 | Boo |
| 10,871,179 B2 | 12/2020 | Håkansson et al. |
| 10,876,562 B2 | 12/2020 | Pervan |
| 10,876,563 B2 | 12/2020 | Derelöv et al. |
| 10,968,936 B2 | 4/2021 | Boo et al. |
| 11,076,691 B2 | 8/2021 | Boo |
| 11,083,287 B2 | 8/2021 | Boo et al. |
| 11,098,484 B2 | 8/2021 | Derelöv |
| 11,137,007 B2 | 10/2021 | Fridlund |
| 11,204,051 B2 | 12/2021 | Brännström et al. |
| 11,246,415 B2 | 2/2022 | Derelöv et al. |
| 2002/0170258 A1 | 11/2002 | Schwitte et al. |
| 2004/0165946 A1 | 8/2004 | Areh et al. |
| 2005/0042027 A1 | 2/2005 | Migli |
| 2005/0236544 A1 | 10/2005 | Mancino |
| 2005/0247653 A1 | 11/2005 | Brooks |
| 2006/0091093 A1 | 5/2006 | Armari |
| 2006/0101769 A1 | 5/2006 | Pervan et al. |
| 2006/0180561 A1 | 8/2006 | Wisnoski et al. |
| 2006/0236642 A1 | 10/2006 | Pervan |
| 2006/0273085 A1 | 12/2006 | Casto |
| 2007/0006543 A1 | 1/2007 | Engström |
| 2007/0028547 A1 | 2/2007 | Grafenauer et al. |
| 2007/0193178 A1 | 8/2007 | Groeke et al. |
| 2008/0010937 A1 | 1/2008 | Pervan et al. |
| 2008/0066415 A1 | 3/2008 | Pervan |
| 2008/0193209 A1 | 8/2008 | Henderson |
| 2008/0216435 A1 | 9/2008 | Nolan |
| 2008/0236088 A1 | 10/2008 | Hannig et al. |
| 2008/0244882 A1 | 10/2008 | Woxman et al. |
| 2009/0014401 A1 | 1/2009 | Tallman |
| 2009/0064624 A1 | 3/2009 | Sokol |
| 2010/0028592 A1 | 2/2010 | Barkdoll et al. |
| 2010/0083603 A1 | 4/2010 | Goodwin |
| 2010/0104354 A1 | 4/2010 | Spalding |
| 2010/0173122 A1 | 7/2010 | Susnjara |
| 2010/0289389 A1 | 11/2010 | Crabtree, II |
| 2011/0023303 A1 | 2/2011 | Pervan et al. |
| 2011/0225921 A1 | 9/2011 | Schulte |
| 2011/0225922 A1 | 9/2011 | Pervan et al. |
| 2011/0280655 A1 | 11/2011 | Maertens et al. |
| 2011/0283650 A1 | 11/2011 | Pervan et al. |
| 2012/0009383 A1 | 1/2012 | Hardesty |
| 2012/0027967 A1 | 2/2012 | Maertens et al. |
| 2012/0073235 A1 | 3/2012 | Hannig |
| 2012/0124932 A1 | 5/2012 | Schulte et al. |
| 2012/0145845 A1 | 6/2012 | Hightower |
| 2012/0180416 A1 | 7/2012 | Perra et al. |
| 2012/0279161 A1 | 11/2012 | Håkansson et al. |
| 2012/0286637 A1 | 11/2012 | Fehre |
| 2013/0014463 A1 | 1/2013 | Pervan |
| 2013/0048632 A1 | 2/2013 | Chen |
| 2013/0071172 A1 | 3/2013 | Maertens et al. |
| 2013/0081349 A1 | 4/2013 | Pervan |
| 2013/0097846 A1 | 4/2013 | Pettigrew |
| 2013/0111845 A1 | 5/2013 | Pervan |
| 2013/0170904 A1 | 7/2013 | Cappelle et al. |
| 2013/0232905 A2 | 9/2013 | Pervan |
| 2013/0287484 A1 | 10/2013 | Phillips |
| 2014/0013919 A1 | 1/2014 | Gerke et al. |
| 2014/0055018 A1 | 2/2014 | Shein et al. |
| 2014/0111076 A1 | 4/2014 | Devos |
| 2014/0286701 A1 | 9/2014 | Sauer |
| 2014/0294498 A1 | 10/2014 | Logan |
| 2015/0034522 A1 | 2/2015 | Itou et al. |
| 2015/0035422 A1 | 2/2015 | Håkansson et al. |
| 2015/0078807 A1 | 3/2015 | Brännström et al. |
| 2015/0078819 A1 | 3/2015 | Derelöv et al. |
| 2015/0196118 A1 | 7/2015 | Derelöv |
| 2015/0198191 A1 | 7/2015 | Boo |
| 2015/0230600 A1 | 8/2015 | Schulte |
| 2015/0330088 A1 | 11/2015 | Derelöv |
| 2015/0368896 A1 | 12/2015 | Schulte |
| 2016/0000220 A1 | 1/2016 | Devos |
| 2016/0007751 A1 | 1/2016 | Derelöv |
| 2016/0145029 A1 | 5/2016 | Ranade et al. |
| 2016/0174704 A1 | 6/2016 | Boo et al. |
| 2016/0186925 A1 | 6/2016 | Bettin |
| 2016/0192775 A1 | 7/2016 | Andersson |
| 2016/0270531 A1 | 9/2016 | Derelöv |
| 2017/0079433 A1 | 3/2017 | Derelöv et al. |
| 2017/0089379 A1 | 3/2017 | Pervan |
| 2017/0097033 A1 | 4/2017 | Håkansson et al. |
| 2017/0159291 A1 | 6/2017 | Derelöv |
| 2017/0208938 A1 | 7/2017 | Derelöv et al. |
| 2017/0227031 A1 | 8/2017 | Boo |
| 2017/0227032 A1 | 8/2017 | Fridlund |
| 2017/0227035 A1 | 8/2017 | Fridlund |
| 2017/0234346 A1 | 8/2017 | Fridlund |
| 2017/0298973 A1 | 10/2017 | Derelöv |
| 2017/0360193 A1 | 12/2017 | Boo et al. |
| 2018/0080488 A1 | 3/2018 | Derelöv |
| 2018/0087552 A1 | 3/2018 | Derelöv et al. |
| 2018/0112695 A1 | 4/2018 | Boo et al. |
| 2018/0119717 A1 | 5/2018 | Derelöv |
| 2018/0202160 A1 | 7/2018 | Derelöv |
| 2018/0283430 A1 | 10/2018 | Leistert |
| 2018/0328396 A1 | 11/2018 | Fransson et al. |
| 2019/0113061 A1 | 4/2019 | Håkansson et al. |
| 2019/0166989 A1 | 6/2019 | Boo et al. |
| 2019/0191870 A1 | 6/2019 | Derelöv |
| 2019/0289999 A1 | 9/2019 | Derelöv et al. |
| 2019/0320793 A1 | 10/2019 | Boo |
| 2019/0323532 A1 | 10/2019 | Boo |
| 2019/0323533 A1 | 10/2019 | Boo |
| 2019/0323534 A1 | 10/2019 | Derelöv |
| 2019/0323535 A1 | 10/2019 | Derelöv |
| 2020/0003242 A1 | 1/2020 | Brännström et al. |
| 2020/0055126 A1 | 2/2020 | Fridlund |
| 2020/0069048 A1 | 3/2020 | Derelöv et al. |
| 2020/0069049 A1 | 3/2020 | Derelöv et al. |
| 2020/0102978 A1 | 4/2020 | Fridlund |
| 2020/0121076 A1 | 4/2020 | Derelöv et al. |
| 2020/0214447 A1 | 7/2020 | Derelöv et al. |
| 2020/0300284 A1 | 9/2020 | Pervan |
| 2020/0337455 A1 | 10/2020 | Boo et al. |
| 2020/0340513 A1 | 10/2020 | Derelöv |
| 2021/0079650 A1 | 3/2021 | Derelöv |
| 2021/0148392 A1 | 5/2021 | Brännström et al. |
| 2021/0180630 A1 | 6/2021 | Bruno et al. |
| 2021/0190112 A1 | 6/2021 | Derelöv |
| 2021/0207635 A1 | 7/2021 | Håkansson et al. |
| 2021/0222716 A1 | 7/2021 | Derelöv et al. |
| 2021/0262507 A1 | 8/2021 | Svensson et al. |
| 2021/0262508 A1 | 8/2021 | Svensson et al. |
| 2021/0276108 A1 | 9/2021 | Derelöv et al. |
| 2021/0285480 A1 | 9/2021 | Derelöv et al. |
| 2021/0381251 A1 | 12/2021 | Svensson |
| 2022/0018373 A1 | 1/2022 | Boo |

(56) References Cited

U.S. PATENT DOCUMENTS

FOREIGN PATENT DOCUMENTS

| | | |
|---|---|---|
| CH | 685 276 A5 | 5/1995 |
| CH | 696 889 A5 | 1/2008 |
| CH | 698 988 B1 | 12/2009 |
| CH | 705 082 A2 | 12/2012 |
| CH | 705082 A2 * 12/2012 | ............. F16B 12/46 |
| CN | 101099618 A | 1/2008 |
| CN | 102 917 616 A | 2/2013 |
| CN | 203424576 U | 2/2014 |
| DE | 1107910 B | 5/1961 |
| DE | 24 14 104 A1 | 10/1975 |
| DE | 25 14 357 A1 | 10/1975 |
| DE | 31 03 281 A1 | 8/1982 |
| DE | 3338976 C1 * 3/1985 | ......... F16B 12/2027 |
| DE | 228 872 A1 | 10/1985 |
| DE | 42 29 115 A1 | 3/1993 |
| DE | 4229115 A1 * 3/1993 | ......... F16B 12/2009 |
| DE | 94 17 168 U1 | 2/1995 |
| DE | 198 31 936 A1 | 2/1999 |
| DE | 298 20 031 U1 | 2/1999 |
| DE | 198 05 538 A1 | 8/1999 |
| DE | 203 04 761 U1 | 4/2004 |
| DE | 299 24 630 U1 | 5/2004 |
| DE | 20 2005 019 986 U1 | 2/2006 |
| DE | 20 2004 017 486 U1 | 4/2006 |
| DE | 20 2009 008 825 U1 | 10/2009 |
| DE | 10 2008 035 293 A1 | 2/2010 |
| DE | 10 2009 041 142 A1 | 3/2011 |
| DE | 10 2011 057 018 A1 | 6/2013 |
| DE | 10 2013 008 595 A1 | 11/2013 |
| DE | 10 2015 103 429 A1 | 10/2015 |
| DE | 10 2014 110 124 A1 | 1/2016 |
| DE | 20 2017 101 856 U1 | 4/2017 |
| EP | 0 060 203 A2 | 9/1982 |
| EP | 0 060 203 A3 | 9/1982 |
| EP | 0 362 968 A | 4/1990 |
| EP | 0 675 332 A2 | 10/1995 |
| EP | 0 871 156 A2 | 10/1998 |
| EP | 1 048 423 A2 | 11/2000 |
| EP | 1 048 423 B9 | 5/2005 |
| EP | 1 650 375 A1 | 4/2006 |
| EP | 1 671 562 A1 | 6/2006 |
| EP | 1 650 375 A8 | 9/2006 |
| EP | 1 922 954 A1 | 5/2008 |
| EP | 2 017 403 A2 | 1/2009 |
| EP | 1 922 954 B1 | 7/2009 |
| EP | 2 333 353 A2 | 6/2011 |
| EP | 1 863 984 B1 | 11/2011 |
| EP | 2 487 373 A1 | 8/2012 |
| EP | 3 031 998 A1 | 6/2016 |
| ER | 0 357 129 A1 | 3/1990 |
| FR | 2 517 187 A1 | 6/1983 |
| FR | 2 597 173 A1 | 10/1987 |
| FR | 2 602 013 A1 | 1/1988 |
| GB | 245332 | 1/1926 |
| GB | 799155 A | 8/1958 |
| GB | 1 022 377 A | 3/1966 |
| GB | 2 163 825 A | 3/1986 |
| GB | 2 315 988 A | 2/1998 |
| GB | 2 445 954 A | 7/2008 |
| GB | 2 482 213 A | 1/2012 |
| GB | 2 520 927 A | 6/2015 |
| JP | S53-113160 U | 9/1978 |
| JP | H06-22606 U | 3/1994 |
| JP | 2003-239921 A | 8/2003 |
| KR | 10-1147274 B1 | 5/2012 |
| KR | 2014-0042314 A | 4/2014 |
| WO | WO 87/07339 A1 | 12/1987 |
| WO | WO 90/07066 | 6/1990 |
| WO | WO 99/22150 A1 | 5/1999 |
| WO | WO 99/41508 A2 | 8/1999 |
| WO | WO 00/66856 A1 | 11/2000 |
| WO | WO 01/53628 A1 | 7/2001 |
| WO | WO 02/055809 A1 | 7/2002 |
| WO | WO 02/055810 A1 | 7/2002 |
| WO | WO 03/083234 A1 | 10/2003 |
| WO | WO 2004/079130 A1 | 9/2004 |
| WO | WO 2005/068747 A1 | 7/2005 |
| WO | WO 2006/043893 A1 | 4/2006 |
| WO | WO 2006/104436 A1 | 10/2006 |
| WO | WO 2007/015669 A2 | 2/2007 |
| WO | WO 2007/015669 A3 | 2/2007 |
| WO | WO 2008/004960 A2 | 1/2008 |
| WO | WO 2008/004960 A3 | 1/2008 |
| WO | WO 2008/004960 A8 | 1/2008 |
| WO | WO 2008/017281 A1 | 2/2008 |
| WO | WO 2008/150234 A1 | 12/2008 |
| WO | WO 2009/136195 A1 | 11/2009 |
| WO | WO 2010/087752 A1 | 8/2010 |
| WO | WO 2011/151758 A2 | 12/2011 |
| WO | WO 2011/151758 A3 | 12/2011 |
| WO | WO 2012/095454 A1 | 7/2012 |
| WO | WO 2012/154113 A1 | 11/2012 |
| WO | WO 2013/009257 A1 | 1/2013 |
| WO | WO 2013/025163 A1 | 2/2013 |
| WO | WO 2013/080160 A1 | 6/2013 |
| WO | WO 2013/118075 A1 | 8/2013 |
| WO | WO 2014/072080 A1 | 5/2014 |
| WO | WO 2014/121410 A1 | 8/2014 |
| WO | WO 2015/015603 A1 | 2/2015 |
| WO | WO 2015/038059 A1 | 3/2015 |
| WO | WO 2015/105449 A1 | 7/2015 |
| WO | WO 2015/105450 A1 | 7/2015 |
| WO | WO 2015/105451 A1 | 7/2015 |
| WO | WO 2016/099396 A1 | 6/2016 |
| WO | WO 2016/175701 A1 | 11/2016 |
| WO | WO 2016/187533 A1 | 11/2016 |
| WO | WO 2017/131574 A1 | 8/2017 |
| WO | WO 2017/138874 A1 | 8/2017 |
| WO | WO 2018/004435 A1 | 1/2018 |
| WO | WO 2018/080387 A1 | 5/2018 |
| WO | WO 2019/125291 A1 | 6/2019 |
| WO | WO 2019/125292 A1 | 6/2019 |

OTHER PUBLICATIONS

U.S. Appl. No. 16/553,325, Peter Derelöv and Johan Svensson, filed Aug. 28, 2019 (Cited herein as US Patent Application Publication No. 2020/0069048 A1 of Mar. 5, 2020).

U.S. Appl. No. 16/553,350, Peter Derelöv and Johan Svensson, filed Aug. 28, 2019 (Cited herein as US Patent Application Publication No. 2020/0069049 A1 of Mar. 5, 2020).

U.S. Appl. No. 16/663,603, Magnus Fridlund, filed Oct. 25, 2019 (Cited herein as US Patent Application Publication No. 2020/0055126 A1 of Feb. 20, 2020).

U.S. Appl. No. 16/703,077, Magnus Fridlund, filed Dec. 4, 2019 (Cited herein as US Patent Application Publication No. 2020/0102978 A1 of Apr. 2, 2020).

U.S. Appl. No. 16/567,436, Peter Derelöv and Mats Nilsson, filed Sep. 11, 2019.

U.S. Appl. No. 16/697,335, Christian Boo and Peter Derelöv, filed Nov. 27, 2019.

U.S. Appl. No. 16/722,096, Peter Derelöv and Christian Boo, filed Dec. 20, 2019.

U.S. Appl. No. 16/567,436, Derelöv.

U.S. Appl. No. 16/697,335, Boo et al.

U.S. Appl. No. 16/722,096, Derelöv et al.

Derelöv, Peter, U.S. Appl. No. 16/567,436 entitled "Panels Comprising a Mechanical Locking Device and an Assembled Product Comprising the Panels," filed Sep. 11, 2019.

Boo, Christian, et al., U.S. Appl. No. 16/697,335 entitled "Panels Comprising a Mechanical Locking Device and an Assembled Product Comprising the Panels," filed Nov. 27, 2019.

Derelöv, Peter, et al. U.S. Appl. No. 16/722,096 entitled "Panels Comprising a Mechanical Locking Device and an Assembled Product Comprising the Panels," filed Dec. 20, 2019.

U.S. Appl. No. 16/951,394, Håkansson et al.

U.S. Appl. No. 16/953,608, Derelöv et al.

(56) References Cited

OTHER PUBLICATIONS

Håkansson, Niclas, et al., U.S. Appl. No. 16/951,394 entitled "Mechanical Locking System for Building Panels," filed Nov. 18, 2020.
Derelöv, Peter, et al., U.S. Appl. No. 16/953,608 entitled "An Assembled Product and a Method of Assembling the Product," filed Nov. 20, 2020.
U.S. Appl. No. 17/119,392, Bruno et al.
U.S. Appl. No. 17/126,518, Derelöv et al.
Bruno, Jimmie, et al. U.S. Appl. No. 17/119,392 entitled "Mechanical Locking System for Panels," filed Dec. 11, 2020.
Derelöv, Peter, U.S. Appl. No. 17/126,518 entitled "Set of Panels with a Mechanical Locking Device," filed Dec. 18, 2020.
U.S. Appl. No. 16/861,639, Derelöv.
U.S. Appl. No. 16/946,047, Pervan.
U.S. Appl. No. 16/915,258, Brännström et al.
Derelöv, Peter, U.S. Appl. No. 16/861,639 entitled "Panels Comprising a Mechanical Locking Device and an Assembled Product Comprising the Panels," filed Apr. 29, 2020.
Pervan, Darko, U.S. Appl. No. 16/946,047 entitled "Mechanical Locking System for Building Panels," filed Jun. 4, 2020.
Brännström, Hans, et al., U.S. Appl. No. 16/915,258 entitled "Assembled Product and Method of Assembling the Assembled Product," filed Jun. 29, 2020.
U.S. Appl. No. 14/486,681, Hans Brännström, Agne Pålsson and Peter Derelöv, filed Sep. 15, 2014 (Cited herein as US Patent Application Publication No. 2015/0078807 A1 of Mar. 19, 2015).
U.S. Appl. No. 14/573,572, Christian Boo, filed Dec. 17, 2014 (Cited herein as US Patent Application Publication No. 2015/0198191 A1 of Jul. 16, 2015).
U.S. Appl. No. 15/271,622, Peter Derelöv and Mats Nilsson, filed Sep. 21, 2016 (Cited herein as US Patent Application Publication No. 2017/0079433 A1 of Mar. 23, 2017).
U.S. Appl. No. 15/308,872, Darko Pervan, filed Nov. 4, 2016 (Cited herein as US Patent Application Publication No. 2017/0089379 A1 of Mar. 30, 2017).
U.S. Appl. No. 15/415,356, Peter Derelöv and Christian Boo, filed Jan. 25, 2017 (Cited herein as US Patent Application Publication No. 2017/0208938 A1 of Jul. 27, 2017).
U.S. Appl. No. 15/422,798, Magnus Fridlund, filed Feb. 2, 2017 (Cited herein as US Patent Application Publication No. 2017/0227035 A1 of Aug. 10, 2017).
U.S. Appl. No. 15/428,469, Magnus Fridlund, filed Feb. 9, 2017 (Cited herein as US Patent Application Publication No. 2017/0227032 A1 of Aug. 10, 2017).
U.S. Appl. No. 15/428,504, Christian Boo, filed Feb. 9, 2017 (Cited herein as US Patent Application publication No. 2017/0227031 A1 of Aug. 10, 2017).
U.S. Appl. No. 15/432,190, Magnus Fridlund, filed Feb. 14, 2017 (Cited herein as US Patent Application Publication No. 2017/0234346 A1 of Aug. 17, 2017).
U.S. Appl. No. 15/642,757, Peter Derelöv, filed Jul. 6, 2017 (Cited herein as US Patent Application Publication No. 2017/0298973 A1 of Oct. 19, 2017).
U.S. Appl. No. 15/646,714, Peter Derelöv, filed Jul. 11, 2017 (Cited herein as US Patent Application Publication No. 2018/0087552 A1 of Mar. 29, 2018).
U.S. Appl. No. 15/562,254, Peter Derelöv, filed Sep. 27, 2017 (Cited herein as US Patent Application Publication No. 2018/0080488 A1 of Mar. 22, 2018).
U.S. Appl. No. 15/567,507, Christian Boo, Peter Derelöv and Agne Pålsson, filed Oct. 18, 2017 (Cited herein as US Patent Application Publication No. 2018/0112695 A1 of Apr. 26, 2018).
U.S. Appl. No. 15/794,491, Peter Derelöv, filed Oct. 26, 2017 (Cited herein as US Patent Application Publication No. 2018/0119717 A1 of May 3, 2018).
U.S. Appl. No. 15/923,701, Peter Derelöv, filed Mar. 16, 2018 (Cited herein as US Patent Application Publication No. 2018/0202160 A1 of Jul. 19, 2018).
U.S. Appl. No. 15/978,630, Jonas Fransson, Niclas Håkansson and Agne Pålsson, filed May 14, 2018 (Cited herein as US Patent Application Publication No. 2018/0328396 A1 of Nov. 15, 2018).
U.S. Appl. No. 16/027,479, Christian Boo and Peter Derelöv, filed Jul. 5, 2018 (Cited in US Patent Application Publication No. 2019/0166989 A1 of Jun. 6, 2019).
U.S. Appl. No. 16/220,585, Peter Derelöv, filed Dec. 14, 2018 (Cited herein as US Patent Application Publication No. 2019/0191870 A1 of Jun. 27, 2019).
U.S. Appl. No. 16/228,975, Niclas Håkansson and Darko Pervan, filed Dec. 21, 2018 (Cited in US Patent Application Publication No. 2019/0113061 A1 of Apr. 18, 2019).
U.S. Appl. No. 15/956,949, Peter Derelöv, filed Apr. 19, 2018.
U.S. Appl. No. 16/361,609, Peter Derelöv, Johan Svensson and Lars Gunnarsson, filed Mar. 22, 2019.
U.S. Appl. No. 16/386,732, Christian Boo, filed Apr. 17, 2019.
U.S. Appl. No. 16/386,810, Christian Boo, filed Apr. 17, 2019.
U.S. Appl. No. 16/386,824, Christian Boo, filed Apr. 17, 2019.
U.S. Appl. No. 16/386,874, Peter Derelöv, filed Apr. 17, 2019.
U.S. Appl. No. 15/956,949, Derelöv.
U.S. Appl. No. 16/361,609, Derelöv et al.
U.S. Appl. No. 16/386,732, Boo.
U.S. Appl. No. 16/386,810, Boo.
U.S. Appl. No. 16/386,824, Boo.
U.S. Appl. No. 16/386,874, Derelöv.
International Search Report/Written Opinion dated Mar. 18, 2019 in PCT/SE2018/051319, ISA/SE, Patent-och registreringsverket, Stockholm, SE, 9 pages.
Derelöv, Peter, U.S. Appl. No. 15/956,949 entitled "Panels for an Assembled Product", filed Apr. 19, 2018.
Derelöv, Peter, et al., U.S. Appl. No. 16/361,609 entitled "Panels Comprising a Mechanical Locking Device and an Assembled Product Comprising the Panels," filed Mar. 22, 2019.
Boo, Christian, U.S. Appl. No. 16/386,732 entitled "Set of Panels With a Mechanical Locking Device," filed Apr. 17, 2019.
Boo, Christian, U.S. Appl. No. 16/386,810 entitled "Set of Panels With a Mechanical Locking Device," filed Apr. 17, 2019.
Boo, Christian, U.S. Appl. No. 16/386,824 entitled "Set of Panels With a Mechanical Locking Device," filed Apr. 17, 2019.
Derelöv, Peter, U.S. Appl. No. 16/386,874 entitled "Symmetric Tongue and T-Cross," filed Apr. 17, 2019.
U.S. Appl. No. 17/398,416, Thomas Meijer, filed Aug. 10, 2021.
Meijer, Thomas, U.S. Appl. No. 17/398,416 entitled "Panels with Edge Reinforcement," filed Aug. 10, 2021.
U.S. Appl. No. 17/514,055, Marko Sostar, filed Oct. 29, 2021.
U.S. Appl. No. 17/524,293, Hans Brännström, Agne Pålsson and Peter Derelöv, filed Nov. 11, 2021.
Sostar, Marko, U.S. Appl. No. 17/514,055 entitled "Set of Panels, A Method for Assembly of the Same, and a Locking Device for a Furniture Product," filed Oct. 29, 2021.
Brännström, Hans, et al., U.S. Appl. No. 17/524,293 entitled "Assembled Product and a Method of Assembling the Assembled Product," filed Nov. 11, 2021.
Extended European Search Report dated Aug. 9, 2021 in EP 18890784.4, European Patent Office, Munich, DE, 7 pages.
U.S. Appl. No. 17/546,356, Peter Derelöv and Hans Brännström, filed Dec. 9, 2021.
U.S. Appl. No. 17/556,146, Christian Boo, filed Dec. 20, 2021.
U.S. Appl. No. 17/665,160, Oscar Rydsjö, Marko Sostar and Patrik Carlsson, filed Feb. 4, 2022.
Derelöv, Peter, et al., U.S. Appl. No. 17/546,356 entitled "Rail for Cabinets," filed Dec. 9, 2021.
Boo, Christian, U.S. Appl. No. 17/556,146 entitled "Wedge-shaped Tongue Groove," filed Dec. 20, 2021.
Rydsjö, Oscar, U.S. Appl. No. 17/665,160 entitled "Mounting Bracket," filed Feb. 4, 2022.

\* cited by examiner

FIG. 8A
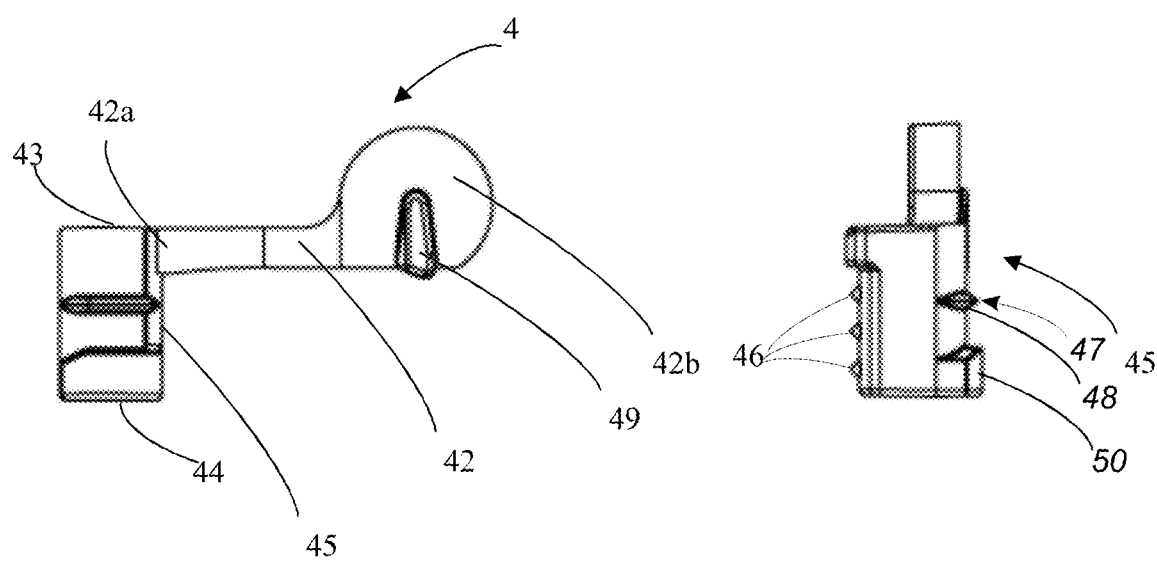
FIG. 8B
FIG. 8C
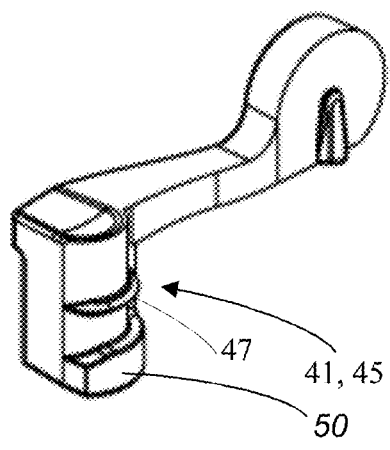
FIG. 8D
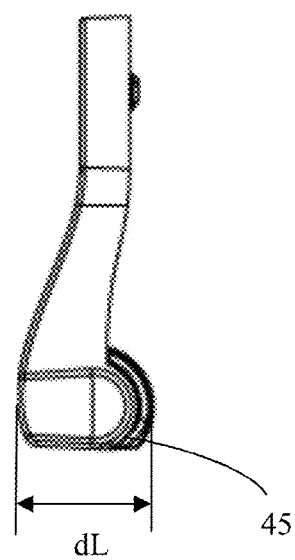

SET OF PANELS

CROSS REFERENCE TO RELATED APPLICATIONS

The present application claims the benefit of Swedish Application No. 1751626-1, filed on 22 Dec. 2017. The entire contents of Swedish Application No. 1751626-1 are hereby incorporated herein by reference in their entirety.

TECHNICAL FIELD

Embodiments of the present invention relate to panels that may be arranged perpendicular to each other and locked together with a mechanical locking device. The panels may be assembled and locked together to obtain a furniture product, such as a bookshelf, a cupboard, a wardrobe, a box, a drawer or a furniture component.

BACKGROUND ART

A furniture product provided with a mechanical locking device is known in the art, as disclosed in WO 2014/072080. The furniture product comprises a first panel connected perpendicular to a second panel by a mechanical locking device comprising a flexible tongue in an insertion groove and a pin that is inserted into the mechanical locking device to move the flexible tongue.

Embodiments of the present invention address a need to provide an easier assembling and/or an increased locking strength of the panels.

SUMMARY

It is an object of at least certain embodiments and aspects of the present invention to provide an improvement over the above described techniques and known art.

A further object of at least certain aspects of the present invention is to facilitate assembling of panels configured to be assembled without the need of using any tools.

A further object of at least certain aspects of the present invention is to facilitate disassembling of panels configured to be assembled and disassembling without the need of tools.

A further object of at least certain aspects of the present invention is to facilitate assembling of panels configured to be assembled with a locking device that is easy to manufacture and to use.

A further object of at least certain aspects of the present invention is to facilitate assembling of panels configured to be assembled with a locking device that is in one piece.

At least some of these and other objects and advantages that may be apparent from the description have been achieved by a set of panels, preferably for a furniture product, comprising a panel and an adjacent panel. The panel comprises a groove and at least one hole connected to the groove via an opening. The adjacent panel comprises a first edge that is configured to be arranged in the groove of the panel. The panel comprises a locking device configured to lock the first edge of the adjacent panel in the groove of the panel. The locking device comprises a cylinder and a lever connected to the cylinder. The cylinder is configured to be arranged in the hole in the panel. The cylinder is an eccentric cylinder comprising a top and bottom base and a locking surface connecting the top and bottom base. The cylinder is configured to act as a cam when the cylinder is turned about an axis in the hole. The lever is configured to, when turned, turn the cylinder about the axis between a mounting position and a locking position, wherein in the mounting position the first edge of the adjacent panel is free to be arranged in the groove of the panel and in the locking position a part of the locking surface of the locking device extends into the groove through the opening and locks the adjacent panel in the groove. Arranged in the groove of the panel may be in a direction of the depth of the groove and/or in a direction along the length of the groove. By a set of panels in accordance to this the adjacent panel and the panel could be locked to each other in an effective way and in an easy way. The eccentric cylinder exerts a force to the adjacent panel that locks the adjacent panel and the panel together in a good way. Embodiments of the locking device do not need any tools to be used. Further, the locking device may be a single piece that is easy to use. Further, by only having a single piece locking device the manufacturing of the locking device could be made in one step and thus reduce the cost for the locking device. Embodiments of the set of panels may involve the advantage that the adjacent panel does not need to be machined in a specific manner to be able to interact with the locking device.

According to an aspect, the locking surface of the cylinder has a cross sectional snail, eccentric or egg shape, which in an easy way can accomplish a needed force from the locking device to the adjacent panel in an easy way.

According to an aspect, the locking surface of the cylinder has a shape that is a combination of a snail, eccentric and/or egg shape, which gives the advantages of that the mounting and locking positions could be stable positions and that the user could get tactile feedback when turning the lever.

According to an aspect, the locking device is arranged to, in the locking position, lock the adjacent panel to the panel by pressing it against a wall of the groove.

According to an aspect, the hole is a circular hole, a circular segment of the hole extends into the groove with the height of the circular segment and the chord of the circular segment defines a width of the opening.

According to an aspect, a largest diameter of the cylinder is substantially equal to the diameter of the hole, which involves that the locking device could be fastened in the hole via friction and at the same time be turned.

According to an aspect, the part of the locking surface extends, in the locking position, through the opening into the groove with a length that is 5-25% of the largest diameter of the cylinder, preferably the length is 10-15% of the largest diameter of the cylinder.

According to an aspect, the length in the radial direction of the cylinder that the part of the locking surface extends into the groove in the locking position substantially corresponds to the height of the circular segment.

According to an aspect, the cylinder, in the mounting position, does not extend through the opening into the groove. The groove is thus free to insert the adjacent panel.

According to an aspect, the length of the part of the locking surface that extends into the groove through the opening is configured to gradually increase when the locking device is moved from the mounting position to the locking position, which gives the user a tactile feedback of that the adjacent panel is locked.

According to an aspect, the locking surface of the cylinder comprises one or more ridges to increase the force that the locking device exert on the adjacent panel, by concentrating the force to one or more points. The ridges can also cut into the adjacent panel and/or the wall of the hole to increase the strength of the locking device and the force exerted.

According to an aspect, the one or more ridges extend around at least a part of a circumference of the locking surface, which opens up for that the force from the locking device could be different in different positions.

According to an aspect, a height of the ridges varies along its extension which further opens up for that the force from the locking device could be different in different positions.

According to an aspect, the one or more ridges has a helical shape configured to press the adjacent panel downwards when moving the locking device from the mounting position to the locking position.

According to an aspect, the adjacent panel comprises a second hole that is configured to be arranged at the opening and to interact with the cylinder to lock the adjacent panel to the panel. According to an aspect, the locking surface of the cylinder comprise at least one ridge that, in the locking position, is configured to be arranged at least partly in the second hole. In addition to the pressing force exerted from the locking device, the second hole interacting with the cylinder achieves a further mechanical lock. The set of panels also involves the advantage of that the adjacent panel does not need to be machined in a complicated manner, since a hole could be accomplished in an easy and cost efficient manner.

According to an aspect, an edge of the ridge has an inclined surface that is configured to interact with a wall of the second hole to press the adjacent panel downwards into the groove of the panel. By having an inclined surface the ridge can press the adjacent panel downwards in the groove.

According to an aspect, the lever is connected to the cylinder at an inner end and at an outer end comprises a lock pin that, in the locking position, is configured to be arranged in the groove at a distance from the hole and to lock the lever from turning from the locking position towards the mounting position.

According to an aspect, the locking device is configured such that the outer end of the lever is, in the mounting position, arranged at a distance from the adjacent panel and in the locking position adjacent, preferably in contact, with the adjacent panel, which makes it easy for a user to grab the outer end and to turn the locking device.

According to an aspect, the locking device is configured such that the lever extends, in the mounting position, in an essentially perpendicular direction or within the range of about 70° to about 110° from the adjacent panel.

According to an aspect, the locking device is configured to be moved between the mounting position and the locking position by turning the lever and the cylinder between 30°-180°, preferably between 90°-180°.

According to an aspect, the panel and the adjacent panel is one of a bottom piece of a drawer, a frame and a back piece of a furniture product.

At least some of the above identified and other objects and advantages that may be apparent from the description have been achieved by a locking device for a furniture product in accordance with the above.

At least some of the above and other objects and advantages that may be apparent from the description have been achieved by a method for assembly of a set of panels in accordance to the above. The method comprising the step of inserting the cylinder of the locking device into the hole of the panel, turning the lever of the locking device to position the locking device in the mounting position, inserting the first edge of the adjacent panel into the groove of the panel, and turning the lever in a first direction to move the locking device from the mounting position to the locking position to lock the first edge of the adjacent panel in the groove.

According to an aspect, the method comprise the further steps of turning the lever in a second direction to move the locking device from the locking position to the mounting position to unlock the first edge of the adjacent panel in the groove, and removing the first edge of the adjacent panel from the groove of the panel.

BRIEF DESCRIPTION OF THE DRAWINGS

These and other aspects, features and advantages of which embodiments of the invention are capable of, will be apparent and elucidated from the following description of embodiments of the present invention, reference being made to the accompanying drawings, in which:

FIGS. 8A-8D disclose a locking device according to an aspect from four different angles.

DETAILED DESCRIPTION

Figure 1:
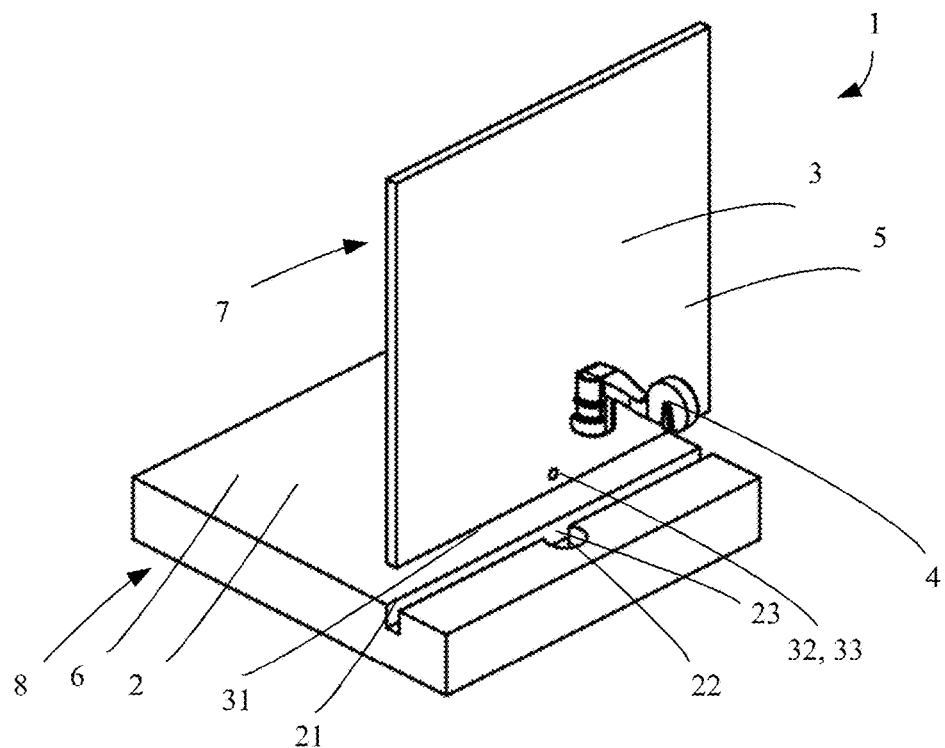
FIG. 1 is a perspective view of a set of panels according to an aspect of the invention in an unassembled state.

Aspects of the present disclosure will be described more fully hereinafter with reference to the accompanying drawings. The set of panels and their parts disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation, for example, definition of dimensions such as width or breadth or height or length or diameter depends on how exemplary aspects are depicted, hence, if depicted differently, a shown width or diameter in one depiction is a length or thickness in another depiction.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example aspects may be implemented at least in part by means of both hardware and software, and that several "means", "units" or "devices" may be represented by the same item of hardware.

When the word "about" is used in this specification in connection with a numerical value, it is intended that the associated numerical value include a tolerance of +/−10% around the stated numerical value.

The different aspects of the invention disclosed herein can be combined with the other aspects described herein. Two or more aspects could be combined.

An embodiment of the present invention, as shown in FIG. 1, to which now is referred to, discloses a set of panels 1. The set of panels 1 are preferably for a furniture product. The set of panels 1 comprise a panel 2 and an adjacent panel 3. The panel 2 and the adjacent panel 3 are arranged to be connected to each other and be perpendicular to each other. The panel 2 and the adjacent panel 3 each preferably comprises four edges, an outer surface 5,6 and an inner surface 7, 8. The outer and/or the inner surfaces may comprise a decorative layer (not shown).

Figure 3:
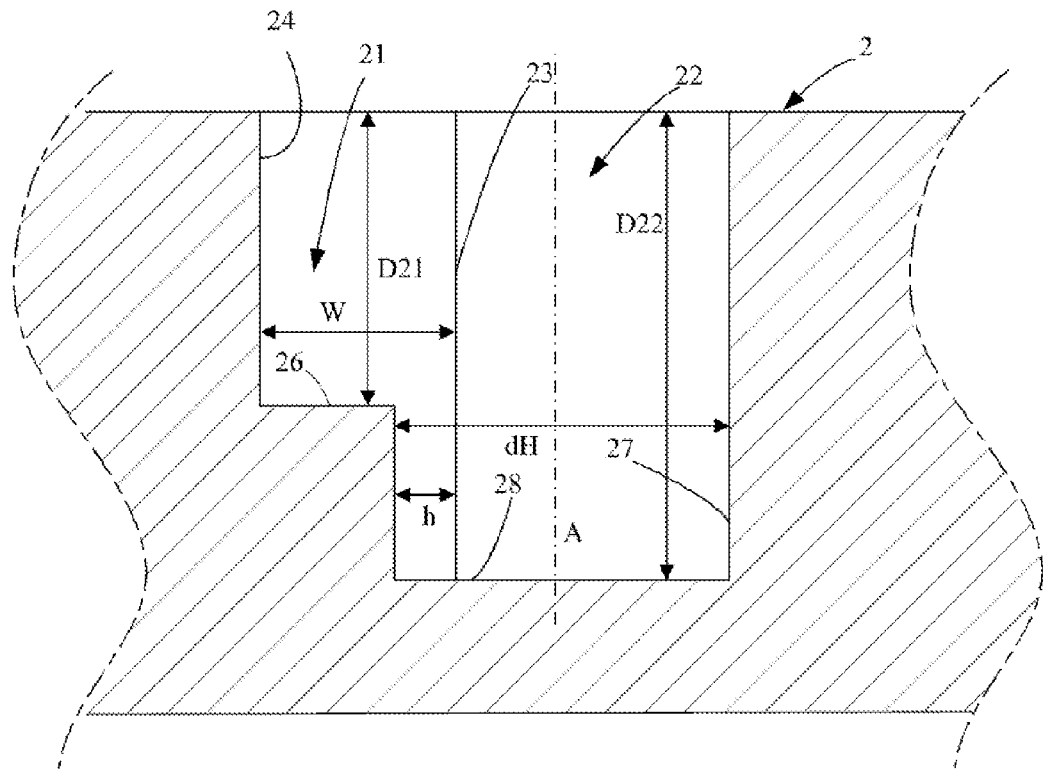
FIG. 3 is a cross sectional view of a part of a panel disclosing a groove and a hole.
Figure 4:
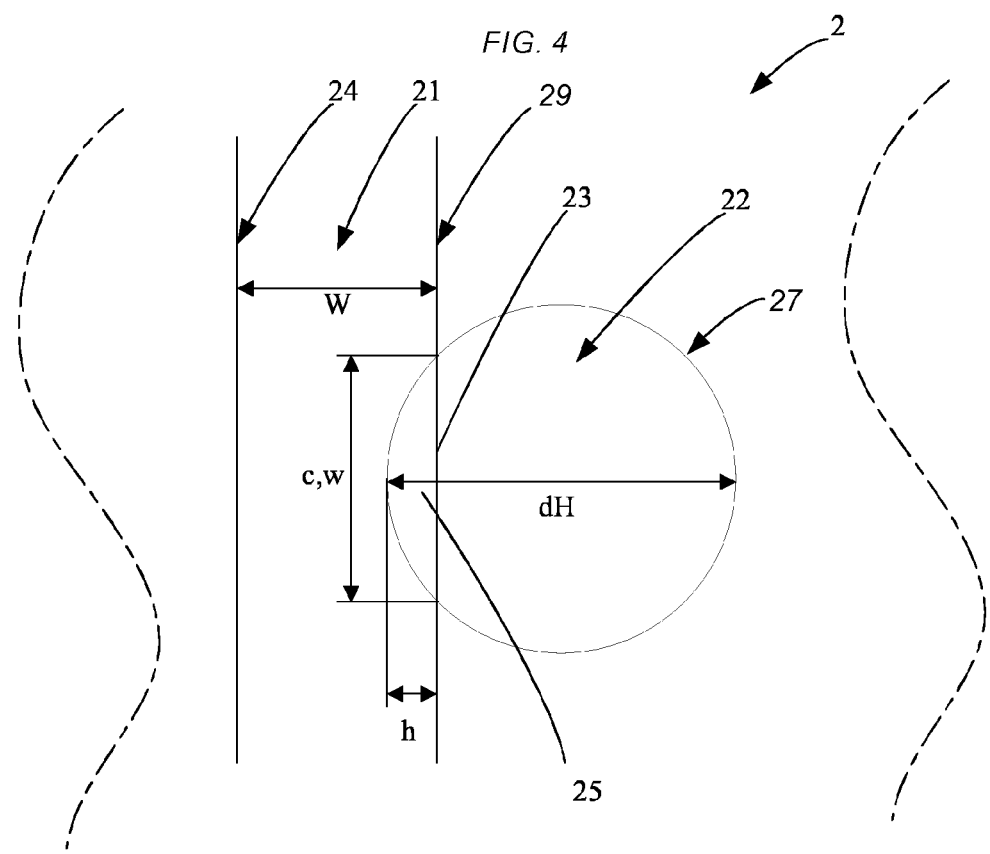
FIG. 4 is a view from above of a part of a panel disclosing the groove and the hole.
Figure 5:
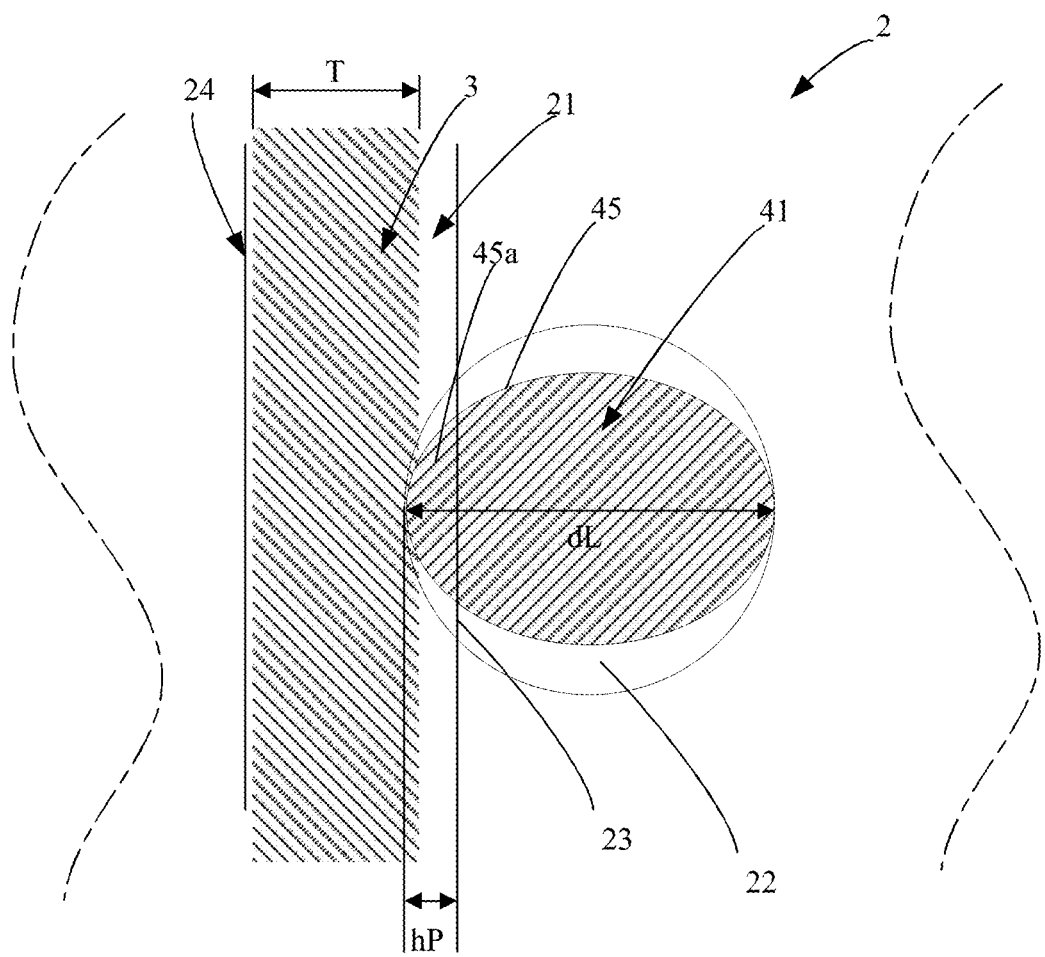
FIG. 5 is a cross sectional view of a part of an assembled set of panels disclosing the adjacent panel in the groove and the cylinder in the hole.

An embodiment of the panel 2 is disclosed in FIGS. 3, 4 and 5. The panel 2 comprise a groove 21 and at least one hole 22. The hole 22 is connected to the groove 21 via an opening 23. The groove 21 has a depth D21 and a width W. The groove 21 runs, according to an aspect, parallel to an edge of the panel 2. The length of the groove 21 is, according to an aspect, equal to or larger than the length of a first edge 31 of the adjacent panel 3 that should be arranged in the groove 21. The circumference of the hole 22, according to an aspect, overlaps the extension of the groove 21. A plane that defines the connection between the hole 22 and the groove 21 is defined as the opening 23. The hole 22 has a depth D22. According to an aspect, the hole 22 is a through going hole (not shown). Depth D22 may be the same or substantially the same as depth D21; alternatively, depth D22 may be greater than depth D21.

According to an aspect, the hole 22 is a circular hole 22, as disclosed in FIGS. 3 and 4. A circular segment 25 of the hole 23 overlaps with the groove 21. Put another way, the circular segment 25 extend into the groove 21. The hole 22 extends into the groove 21 with the height h of the circular segment 25. A chord c of the circular segment 25 that extends into the groove 21 is another way to describe the opening 23. The length of the chord c of the circular segment 25 defines a width w of the opening 23. The hole 22 has a diameter dH.

The groove 21 has walls 24,29 and a bottom 26. The hole 22 has wall 27 and a bottom 28. The hole 22 defines an axis A.

Figure 2A:
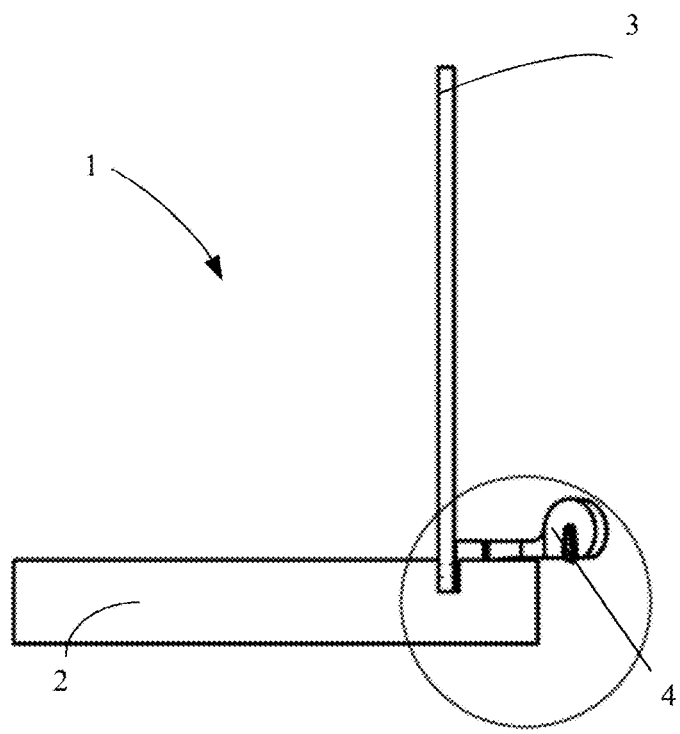
FIGS. 2A and 2B show a side view of a set of panels in an assembled state and an enlargement of the locking device.
Figure 2B:
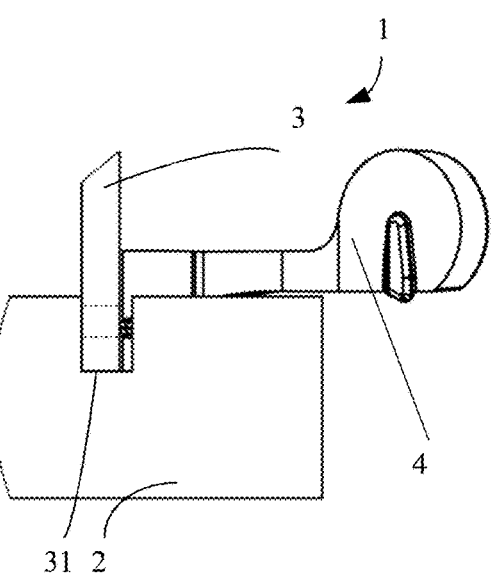

The adjacent panel 3 comprises a first edge 31, as disclosed in FIGS. 1, 2A, and 2B. The first edge 31 of the adjacent panel 3 is configured to be arranged in the groove 21 of the panel 2. The thickness of the adjacent panel 3, at least at the first edge 31, is equal to or smaller than the width W of the groove 21 of the panel 2. According to an aspect, the adjacent panel 3 comprises a second hole 32. The position of the second hole 32 is such that it is configured to be arranged at the opening 23 of the panel 2. According to an aspect, the second hole 32 is configured to interact with the cylinder 41 to lock the adjacent panel 3 to the panel 2. The second hole 32 has a wall 33. According to an aspect, the second hole 32 is a through going hole 32. According to an aspect, the second hole 32 has a bottom (not shown).

The panel 2 comprises a locking device 4. The locking device 4 is configured to lock the first edge 31 of the adjacent panel 3 in the groove 21 of the panel 2. Put another way, the locking device 4 is adapted to lock the adjacent panel 3 to the panel 2. By lock is meant that that the first edge 31 of the adjacent panel 3 is restricted from moving out of the groove 21 of the panel 2. Put another way, the locking device 4 increases the force in at least one direction that has to be exerted to the adjacent panel 3 in comparison to the force that has to be exerted to the adjacent panel 3 to remove it from the groove 21 without the locking device 4. For example, the increased force may be at least twice as great, or at least five times as great.

The locking device 4 is disclosed in more detail in FIGS. 5 and 6A-8D. The locking device 4 comprises a cylinder 41 and a lever 42. The lever 42 is connected to the cylinder 41. The cylinder 41 is configured to be arranged in the hole 22 in the panel 2. The cylinder 41 is an eccentric cylinder 41. The cylinder comprises a top base 43, a bottom base 44 and a locking surface 45 connecting the top and bottom base 43, 44. By eccentric cylinder 41 is meant that the cylinder 41 has different lengths of its axis in different directions. According to an aspect, the eccentric shape of the cylinder is one or a combination of a snail shape, an elliptic shape (as disclosed in FIG. 5), an egg shape or a drop shape. According to an aspect, the locking surface 45 of the cylinder 41 has a cross sectional snail, eccentric, elliptic or egg shape. According to an aspect, the locking surface 45 of the cylinder 41 has a cross sectional shape that is a combination of at least one or more of snail, eccentric, elliptic or egg shape as disclosed in FIGS. 6A-8D. According to an aspect, the locking surface 45 of the cylinder 41 has a shape that is a combination of a snail, eccentric and/or egg shape.

The locking device 4 may be made of a material that is one or a mix of a metal or a polymer material, such as a thermoplastic material, preferably with an reinforcement, such as glass fibre. The locking device 4 may be produced by injection moulding.

The cylinder 41 is configured to act as a cam when the cylinder 41 is turned about the axis A in the hole 22. The cylinder 41 will interact with the adjacent panel 3 and may move it when it is turned, or at least exert a force on the adjacent panel 3. The eccentricity of the cylinder 41 involves that the distance from the axis A that the cylinder 41 is turned about to the locking surface 45 in a specific direction will change when the cylinder 41 is turned. According to an aspect, the largest diameter dL of the cylinder 41 is substantially equal to the diameter of the hole dH. Substantially equal may be within 10% of each other, or within 5% of each other, or within 3% of each other. Put another way, the largest diameter dL of the cylinder is the longest distance along a line between two points on the locking surface 45. According to an aspect, the largest diameter dL of the cylinder is the longest distance along a line between two points on the locking surface 45a and including a central point of the cylinder 41. By having the diameter including the largest diameter dL of the cylinder 41 being designed to correlate with the diameter of the hole 22, the cylinder 41 can be arranged in the hole 22 and held in position in the hole 22 by friction between the walls 27 of the hole 22 and the cylinder 41.

According to an aspect, the locking surface 45 of the cylinder 41 comprises one or more ridges 46 as disclosed in FIGS. 6A-8D. According to an aspect, as disclosed in FIGS. 6A-D, the locking device 4 comprises six ridges 46 on the locking surface 45. According to an aspect, as disclosed in FIGS. 7A-D, the locking device 4 comprises three ridges 46 on the locking surface 45. According to an aspect, as disclosed in FIGS. 8A-D, the locking device 4 comprises three ridges 46 on one side of the locking surface 45, as disclosed in FIG. 8B, and one ridge 47 on another side of the locking surface 45, as disclosed in FIGS. 8A-8C. The ridges 46 concentrates the force exerted from the locking device 4 to the adjacent panel 2 to the edges of the ridges 46. The force from the locking device 4 is divided between the number of ridges 46. If there are a low number of ridges 46 the force exerted by each ridge 46 is larger than if there are more ridges 46. According to an aspect, the ridges are adapted to cut into the wall 26 of the hole 22. According to an aspect, the ridges are adapted to cut into the panel 2 as disclosed in FIG. 10.

According to an aspect, the one or more ridges 46 extend around at least a part of a circumference of the locking surface 45. According to an aspect, the ridges extend around the whole circumference of the locking surface 45. According to an aspect, the ridges extend around between 270°-359° of the circumference of the locking surface 45. According to an aspect, the ridges extend around between 180°-269° of the circumference of the locking surface 45. According to an aspect, the ridges extend around between 90°-179° of the circumference of the locking surface 45. According to an aspect, the ridges extend around between 10°-89° of the circumference of the locking surface 45. The ridges 46 have a height in the radial direction of the cylinder 41. Put another way, the height of the ridges 46 is the distance/length that the ridges 46 extend in the radial direction. According to an aspect, the ridge 46 have an triangular shape with a top angle that is equal to or less than 90°, such that the ridge 46 has a sharp edge that is adapted to interact with the wall 26 of the hole 22.

According to an aspect, the height of the ridges 46 varies along its extension. Put another way, the height of the ridges 46 varies along the circumference of the locking surface 45. According to an aspect, the one or more ridges 46 has a helical shape.

According to an aspect, the locking surface 45 of the cylinder 41 comprises at least one ridge 47, as is disclosed in FIGS. 8A-D. According to an aspect, an edge of the ridge 47 has an inclined surface 48. The locking device 4 may comprise a protruding part 50 below the ridge 47 and at the bottom base 44. The protruding part may be configured to cooperate with the wall 27 of the hole 22 which may reduce or prevent tilting of the locking device 4, see FIG. 10C.

Figure 6A:
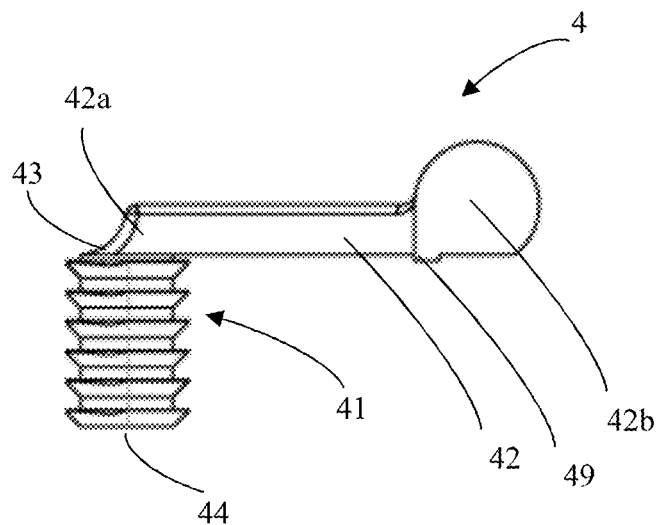
FIGS. 6A-6D disclose a locking device according to an aspect from four different angles.
Figure 6B:
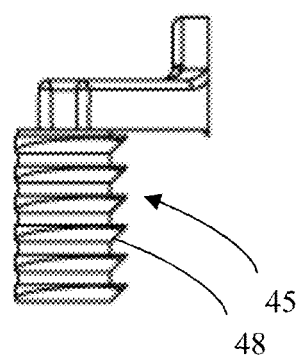
Figure 6C:
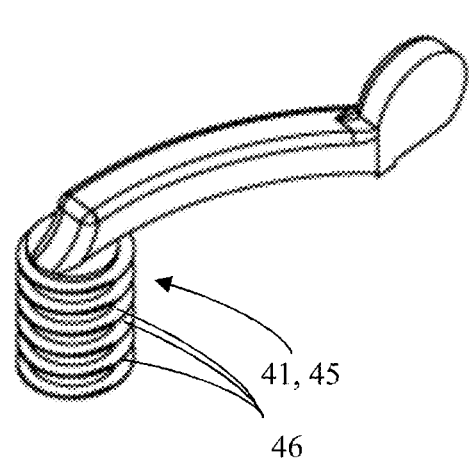
Figure 6D:
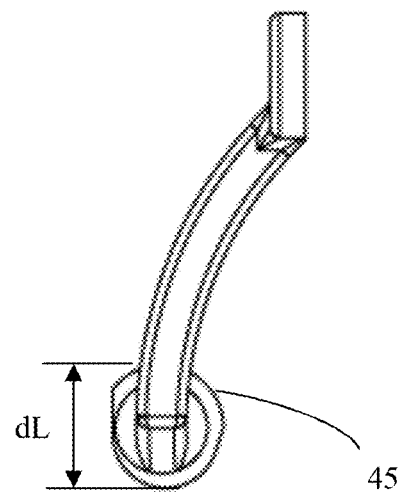
Figure 7A:
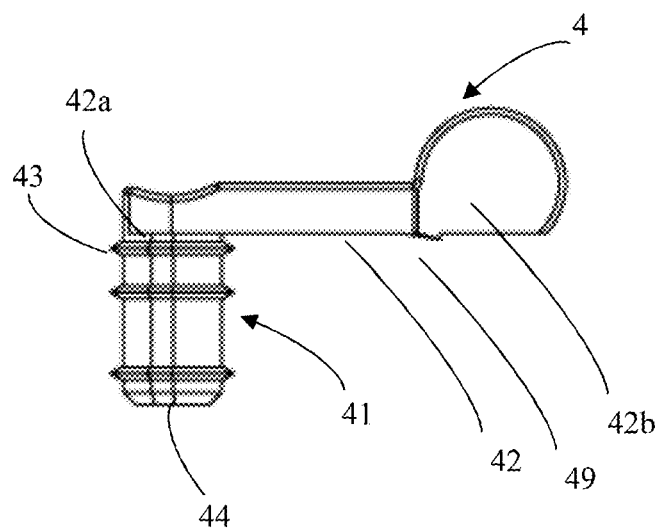
FIGS. 7A-7D disclose a locking device according to an aspect from four different angles.
Figure 7B:
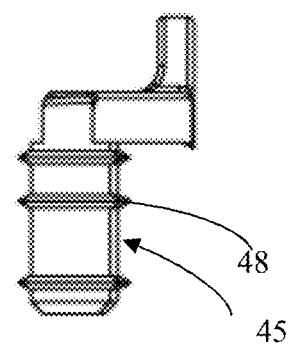
Figure 7C:
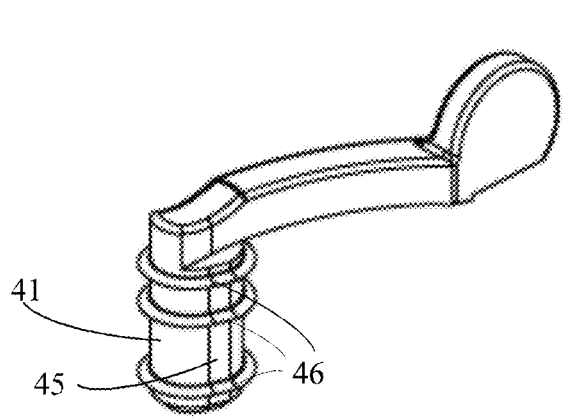
Figure 7D:
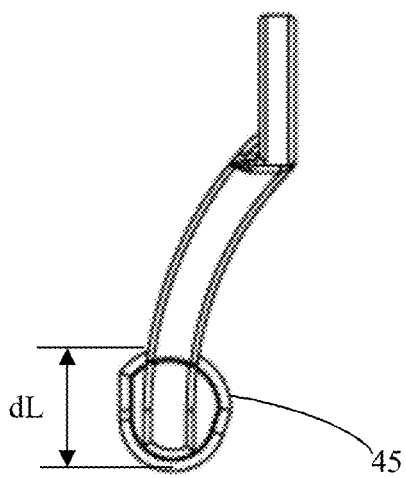

The lever 42 has an inner end 42a and an outer end 42b, as disclosed in FIGS. 6A, 7A, and 8A. The lever 42 is connected to the cylinder 41. The inner end 42a of the lever 42 is connected to the cylinder 41. The lever 42 comprises, according to an aspect, a lock pin 49 at the outer end 42b. According to an aspect, the lock pin 49 may lock against the outer surface 6 of the panel 2. According to an aspect, the outer end 42b comprises a handle configured to be moved by a user.

Figure 9A:
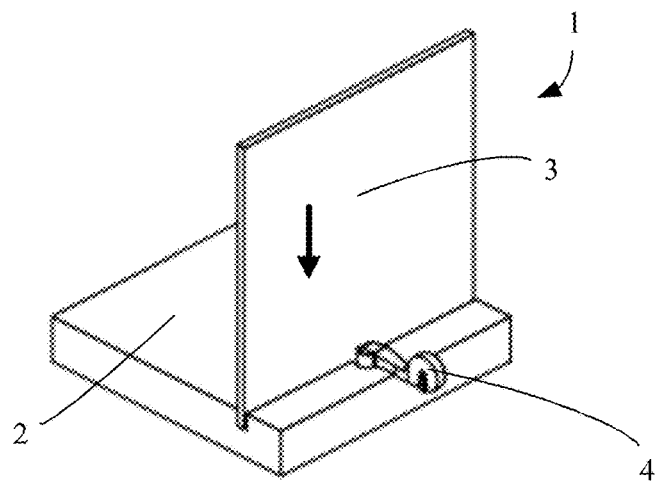
FIGS. 9A-9C disclose a perspective view of a set of panels according to an aspect in the mounting position, an intermediate position between the mounting and locking position and in the locking position from four different angles.
Figure 9B:
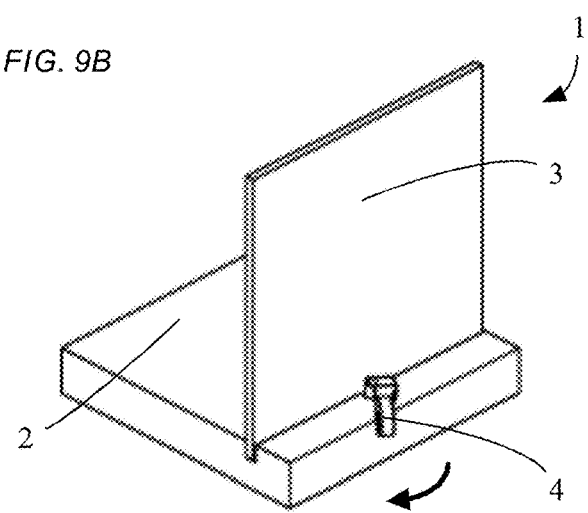
Figure 9C:
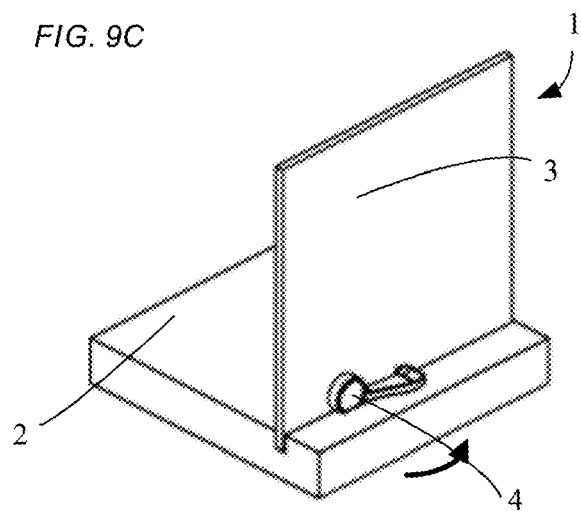

The lever 42 is configured to, when turned, turn the cylinder 41 about the axis A between a mounting position, as disclosed in FIG. 9A, and a locking position, as disclosed in FIG. 9C. According to an aspect, the locking device 4 is configured to be moved between the mounting position and the locking position by turning the lever 42 and the cylinder 41 between 30°-180°. According to an aspect, the locking device 4 is configured to be moved between the mounting position and the locking position by turning the lever 42 and the cylinder 41 between 90°-180°.

In the mounting position the first edge 31 of the adjacent panel 3 is free to be arranged in the groove 21 of the panel 2. The first edge 31 of the adjacent panel 3 is arranged in the groove 21 by moving the adjacent panel 3 toward the panel 2, as shown by the arrow in FIG. 9A, and inserting the first edge 31 into the groove 21. According to an aspect, the cylinder 41 does not extend through the opening 23 into the groove 21 in the mounting position. According to an aspect, the cylinder 41 may slightly extend through the opening 23 into the groove 21 in the mounting position; however, in the locking position, the cylinder 41 extends further into the groove 21.

According to an aspect, the locking device 4 is configured such that the lever 42 extends, in the mounting position, in an essentially perpendicular direction or within the range of about 70° to about 110° from the adjacent panel 3, as disclosed in FIG. 9A.

In the locking position a part 45a of the locking surface 45 of the locking device 4 extend into the groove 21 through the opening 23 and lock the adjacent panel 3 in the groove 21, as disclosed in FIG. 5. In the locking position the adjacent panel 3 is locked against the panel 2. According to an aspect, the locking device 4 is arranged to, in the locking position, lock the adjacent panel 3 to the panel 2 by pressing it against the wall 24 of the groove 21. The part 45a that extend into the groove 21 makes contact with the adjacent panel 3 and press it against the wall 24 of the groove 21. The part 45a extends through the opening 23 with a length hP, as disclosed in FIG. 5. According to an aspect, the part 45a of the locking surface 45 extend, in the locking position, through the opening 23 into the groove 21 with a length hP that is 5-25% of the largest diameter dL of the cylinder 41. According to an aspect, the part 45a of the locking surface 45 extend, in the locking position, through the opening 23 into the groove 21 with a length hP that is 10-15% of the largest diameter dL of the cylinder 41.

According to an aspect, the radial direction of the cylinder that the part 45a of the locking surface 45 that extends into the groove 21 in the locking position substantially corresponds to the height h of the circular segment 25. Put another way, the direction of the height h of the circular segment 25 is the same as the direction of the length hP of the part 45a of the locking surface 45.

According to an aspect, the outer end 42b of the lever 42 is, in the mounting position, arranged at a distance from the adjacent panel 3. According to an aspect, the outer end 42b of the lever 42 is, in the locking position, arranged adjacent with the adjacent panel 3. According to an aspect, the outer end 42b of the lever 42 is, in the locking position, arranged in contact with the adjacent panel 3. According to an aspect, the lock pin 49 is, in the locking position, configured to be arranged in the groove 21 to lock the lever 42 from turning from the locking position towards the mounting position. According to an aspect, the lock pin 49 is, in the locking position, arranged in the groove 21 at a distance from the hole 22, as disclosed in FIG. 9C.

According to an aspect, the length of the part 45a of the locking surface 45 that extend into the groove 21 through the opening 23 is configured to gradually increase when the locking device 4 is moved from the mounting position to the locking position. As the lever 42 is moved from the mounting position towards the locking position the size of the part 45a of the locking surface 45 that extends through the opening 23 increases gradually such that the force exerted from the locking device 4 on the adjacent panel 3 is also increased gradually. This gives a user of the locking device 4 tactile feedback of that the adjacent panel 3 is tighter and tighter locked in the groove 21.

According to an aspect, the inclined surface 48 of the edge of the ridge 47 is configured to interact with the wall 33 of the second hole 32 in the locking position. According to an aspect, the inclined surface 48 is configured to, in the locking position, press the adjacent panel 3 downwards in the groove 21 of the panel 2.

According to an aspect, the helically shaped ridges 46 are configured to press the adjacent panel 3 downwards when moving the locking device 4 from the mounting position to the locking position. According to an aspect, at least one ridge 47 is, in the locking position, configured to be arranged at least partly in the second hole 32, as disclosed in FIG. 10c. The ridge 47 will act as a further lock and lock the adjacent panel 3 in the groove 21.

Figure 10A:
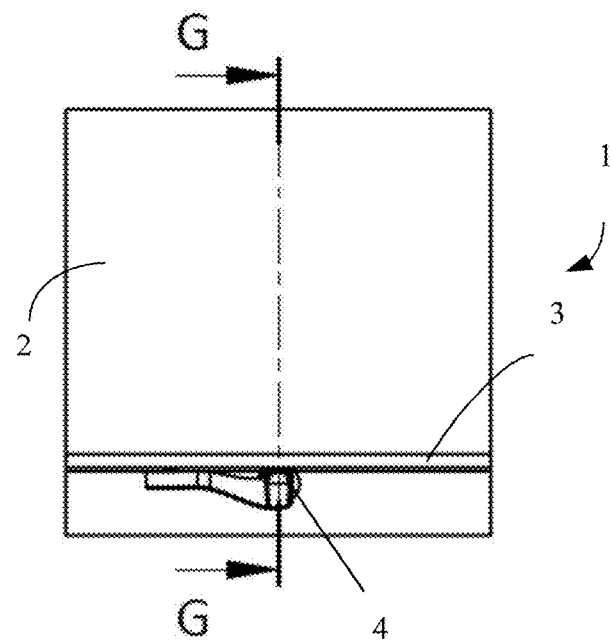
FIGS. 10A-10C disclose a set of panels from above and a cross sectional view of the set of panels along line G-G in FIG. 10A and an enlargement of the locking device.
Figure 10B:
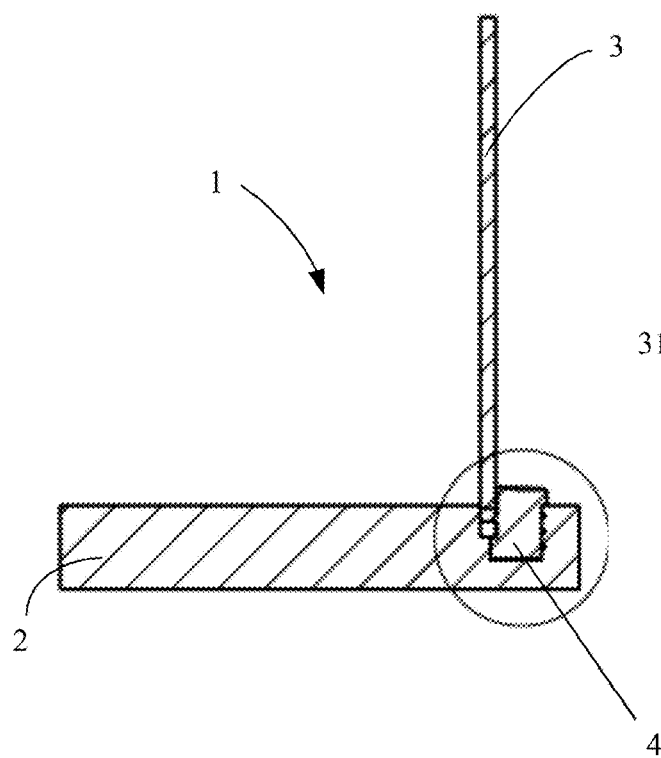
Figure 10C:
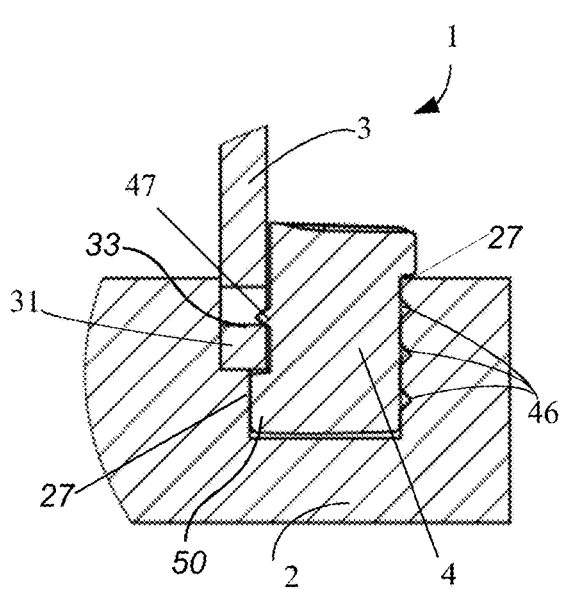

According to an aspect, the ridges are adapted to cut into the wall 27 of the hole 22, as is disclosed in FIG. 10, and/or the adjacent panel 3 when the locking device is moved from the mounting position towards the locking position. As the locking device 4 is turned the ridges will exert a force against the adjacent panel 3 and the wall 27 of the hole 22. If the force exceeds a value, depending on the material of the locking device 4, the adjacent panel 3 and the wall 27, the ridges 46 of the locking device 4 will cut into one or both of the wall 27 and the adjacent panel 3.

According to an aspect, the adjacent panel 3 comprises further edges that are configured to be locked against further panels 2.

According to an aspect, the panel comprises two or more holes 22 at the groove 21 and a corresponding number of locking devices 4 configured to be arranged in each hole 22. According to an aspect, the panel comprises two or more grooves 21.

According to an aspect, the panel 2 and the adjacent panel 3 is one of a bottom piece of a drawer, a frame and a back piece of a furniture product.

Hereafter a method for assembly and disassembly of the set of panels 1 according to the above will be described with reference to FIG. 9A-9C.

When a user should assembly the set of panels 1 the following step is performed. The cylinder 41 of the locking device 4 is inserted into the hole 22 of the panel 2. Thereafter the lever 42 is turned to position the locking device 4 in the mounting position.

The first edge 31 of the adjacent panel 3 is inserted into the groove 21 of the panel 2.

When the first edge 31 of the adjacent panel 3 is positioned in the groove 21 the lever 42 is turned in a first direction, as disclosed by the arrow in FIG. 9B, to move the locking device 4 from the mounting position to the locking position to lock the first edge 31 of the adjacent panel 3 in the groove 21.

According to an aspect, the edge 31 of the adjacent panel 3 is inserted into the groove 21 of the panel 2 before the locking device 4 is arranged in the hole 22. Thereafter the locking device 4 is inserted into the hole 22 with the locking device positioned in the mounting position in relation to the adjacent panel 3 and the panel 2. Thus, the above described steps do not have to be performed in a specific order to lock the adjacent panel 3 to the panel 2.

According to an aspect, the locking device 4 is inserted into the hole 22 in a factory by another user or by a machine. Thus, the steps of the method could be divided to be performed by different users or by a machine.

According to an aspect, the set of panels 1 are one of a bottom piece of a drawer, a frame, a back piece of a furniture product and a panel for reinforcing an edge.

After the set of panels 1 are assembled and the user, or another user, would like to disassembly the set of panels 1 the following steps are performed. Turning the lever 42 in a second direction, as disclosed by the arrow in FIG. 9C, to move the locking device 4 from the locking position to the mounting position to unlock the first edge 31 of the adjacent panel 3 in the groove 21. When the lever 42 is moved back to the mounting position the cylinder 41 will turn together with it. As the cylinder 41 turns towards the mounting position the length of the part 45a of the locking surface 45 that extend through the opening 23 decreases and the force exerted by the locking device 4 on the adjacent panel 3 is thus also decreased. Thereafter, the first edge 31 of the adjacent panel 3 is removed from the groove 21 of the panel 2 and the set of panels 1 is disassembled.

According to an aspect, the above steps are repeated and the set of panels 1 is assembled again. According to an aspect, the panel 2 and/or the adjacent panel 3 is locked to another adjacent panel 3 and/or panel 2.

According to an aspect, the panel 2 comprises a groove 21 that has a width W is equal to or smaller than the width T of the adjacent panel 3 and the largest diameter dL of the locking device 4 and that is larger than the width T of the adjacent panel 3 and the smallest diameter of the locking device 4. According to an aspect, the edge 31 of the adjacent panel 3 and the locking device 4 are configured to be arranged in the groove 21 and the locking device 4 is turned in the groove 21 between the mounting position and the locking position.

According to an aspect, the set of panels are resilient panels. The resilient panels may comprise a core comprising thermoplastic material. The thermoplastic material may be foamed.

The thermoplastic material may comprise polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof. The core may be formed of several layers.

The aspects described above may comprise a decorative layer, such as a decorative foil comprising a thermoplastic material. The thermoplastic material of the decorative layer may be or comprise polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof. The decorative foil is preferably printed, for example by direct printing, rotogravure, or digital printing. According to an aspect, the decorative layer comprise melamine, a high pressure laminate (HPL) or a veneer.

The aspects described above may comprise a wear layer such as a film or foil. The wear layer may comprise thermoplastic material. The thermoplastic material may be polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

The aspects described above may comprise a panels comprising a wood base core, such as HDF, MDF, plywood, particleboard, OSB or masonite.

EMBODIMENTS

1. A set of panels (1), preferably for a furniture product, comprising a panel (2) and an adjacent panel (3), wherein
    the panel (2) comprises a groove (21) and at least one hole (22) connected to the groove (21) via an opening (23),
    the adjacent panel (3) comprises a first edge (31) that is configured to be arranged in the groove (21) of the panel (2), and
    the panel (2) comprises a locking device (4) configured to lock the first edge (31) of the adjacent panel (3) in the groove (21) of the panel (2), wherein
        the locking device (4) comprises a cylinder (41) and a lever (42) connected to the cylinder (41),
        the cylinder (41) is configured to be arranged in the hole (22) in the panel (2),
        the cylinder (41) is an eccentric cylinder (41) comprising a top and bottom base (43, 44) and a locking surface (45) connecting the top and bottom base (43, 44),
        the cylinder (41) is configured to act as a cam when the cylinder (41) is turned about an axis (A) in the hole (22), and
        the lever (42) is configured to, when turned, turn the cylinder (41) about the axis (A) between a mounting position and a locking position, wherein
            in the mounting position, the first edge (31) of the adjacent panel (3) is configured to be arranged in the groove (21) of the panel (2), and
            in the locking position, a part (45a) of the locking surface (45) of the locking device (4) extend into the groove (21) through the opening (23) and lock the adjacent panel (3) in the groove (21).
2. The set of panels (1) according to embodiment 1, wherein the locking surface (45) of the cylinder (41) has a cross sectional snail, eccentric elliptic or egg shape.
3. The set of panels (1) according to embodiment 2, wherein the locking surface (45) of the cylinder (41) has a shape that is a combination of a snail, eccentric and/or egg shape.
4. The set of panels (1) according to any of the preceding embodiments, wherein the locking device (4) is arranged to, in the locking position, lock the adjacent panel (3) to the panel (2) by pressing it against a wall (24) of the groove (21).
5. The set of panels (1) according to any of the preceding embodiments, wherein the hole (22) is a circular hole, a circular segment (25) of the hole (23) extends into the groove (21) with the height (h) of the circular segment (25) and the chord (c) of the circular segment (25) define a width (w) of the opening (23).
6. The set of panels according to any of embodiments 4 or 5, wherein a largest diameter (dL) of the cylinder (41) is substantially equal to the diameter of the hole (dH).
7. The set of panels (1) according to any of the preceding embodiments, wherein, in the locking position, the part (45a) of the locking surface (45) extend through the opening (23) into the groove (21) with a length (hP) that is 5-25% of the largest diameter (dL) of the cylinder (41), preferably the length (hP) is 10-15% of the largest diameter (dL) of the cylinder (41).
8. The set of panels (1) according to embodiment 7, wherein the length (hP) in the radial direction of the cylinder that the part (45a) of the locking surface (45) extends into the groove (21) in the locking position substantially corresponds to the height (h) of the circular segment (25).
9. The set of panels (1) according to any of the preceding embodiments, wherein, in the mounting position, the cylinder (41) does not extend through the opening (23) into the groove (21).
10. The set of panels (1) according to any of embodiments 7-9, wherein of the length (hP) of the part (45a) of the locking surface (45) that extend into the groove (21) through the opening (23) is configured to gradually increase when the locking device (41) is moved from the mounting position to the locking position.
11. The set of panels (1) according to any of the preceding embodiments, wherein the locking surface (45) of the cylinder (41) comprise one or more ridges (46).
12. The set of panels (1) according to embodiment 11, wherein the one or more ridges (46) extend around at least a part of a circumference of the locking surface (45).
13. The set of panels (1) according to embodiment 11 or 12, wherein a height of the ridges (46) varies along its extension.
14. The set of panels (1) according to any of embodiments 11-13, wherein the one or more ridges (46) has a helical shape configured to press the adjacent panel (3) downwards when moving the locking device (4) from the mounting position to the locking position.
15. The set of panels (1) according to any of the preceding embodiments, wherein the adjacent panel (3) comprise a second hole (32) that is configured to be arranged at the opening (23) and to interact with the cylinder (41) to lock the adjacent panel (3) to the panel (2).
16. The set of panels (1) according to embodiment 15, wherein the locking surface (45) of the cylinder (41) comprise at least one ridge (47) that, in the locking position, is configured to be arranged at least partly in the second hole (32).
17. The set of panels (1) according to embodiment 16, wherein a edge of the ridge (47) has an inclined surface (48) that is configured to interact with a wall (33) of the second hole (32) to press the adjacent panel (3) downwards into the groove (21) of the panel (2).
18. The set of panels (1) according to any of the preceding embodiments, wherein the lever (42) is connected to the cylinder (41) at an inner end (42a) and at an outer end (42b) comprise a lock pin (49) that, in the locking position, is configured to be arranged in the groove (21) at a distance from the hole (22) and to lock the lever (42) from turning from the locking position towards the mounting position.
19. The set of panels (1) according to embodiment 18, wherein the locking device (4) is configured such that the outer end of the lever (42b) is, in the mounting position, arranged at a distance from the adjacent panel (3) and in the locking position adjacent, preferably in contact, with the adjacent panel (3).
20. The set of panels (1) according to embodiment 18 or 19, wherein the locking device (4) is configured such that the lever (42) extends, in the mounting position, in an essentially perpendicular direction or within the range of about 70° to about 110° from the adjacent panel (3).
21. The set of panels (1) according to any of the preceding embodiments, wherein the locking device (4) is configured to be moved between the mounting position and the locking position by turning the lever (42) and the cylinder (41) between 30°-180°, preferably between 90°-180°.
22. The set of panels (1) according to any of the preceding embodiments, wherein the panel (2) and the adjacent panel (3) is one of a bottom piece of a drawer, a frame and a back piece of a furniture product.
23. A locking device (4) for a furniture product in accordance with any of embodiments 1-22.

24. A method for assembly of a set of panels (1) in accordance to any of embodiments 1-22, comprising the step of:
  a) inserting the cylinder (41) of the locking device (4) into the hole (22) of the panel (2),
  b) turning the lever (42) of the locking device (4) to position the locking device (4) in the mounting position,
  c) inserting the first edge (31) of the adjacent panel (3) into the groove (21) of the panel (2), and
  d) turning the lever (42) in a first direction to move the locking device (4) from the mounting position to the locking position to lock the first edge (31) of the adjacent panel (3) in the groove (21).
25. The method according to embodiment 24, the method comprise the further steps of
  e) turning the lever (42) in a second direction to move the locking device (4) from the locking position to the mounting position to unlock the first edge (31) of the adjacent panel (3) in the groove (21), and
  f) removing the first edge (31) of the adjacent panel (3) from the groove (21) of the panel (2).

The invention claimed is:

1. A set of panels comprising a panel and an adjacent panel, wherein
  the panel comprises a groove and at least one hole connected to the groove via an opening,
  the adjacent panel comprises a first edge that is configured to be arranged in the groove of the panel, and
  the panel comprises a locking device configured to lock the first edge of the adjacent panel in the groove of the panel, wherein
    the locking device comprises a cylinder and a lever connected to the cylinder,
    the cylinder is configured to be arranged in the hole in the panel,
    the cylinder is an eccentric cylinder comprising a top and bottom base and a locking surface connecting the top and bottom base, the cylinder being eccentric along an entire length of the cylinder from the top base to the bottom base,
    the cylinder is configured to act as a cam when the cylinder is turned about an axis in the hole, and
    the lever is configured to, when turned, turn the cylinder about the axis between a mounting position and a locking position, wherein
      in the mounting position, the first edge of the adjacent panel is configured to be arranged in the groove of the panel, and
      in the locking position, a part of the locking surface of the locking device extends into the groove through the opening and locks the adjacent panel in the groove.

2. The set of panels according to claim 1, wherein the locking surface of the cylinder has a cross sectional eccentric or elliptic shape.

3. The set of panels according to claim 2, wherein the locking surface of the cylinder has a shape that is elliptic.

4. The set of panels according to claim 1, wherein the locking device is arranged to, in the locking position, lock the adjacent panel to the panel by pressing it against a wall of the groove.

5. The set of panels according to claim 4, wherein a largest diameter of the cylinder is substantially equal to the diameter of the hole.

6. The set of panels according to claim 1, wherein the hole is a circular hole, a circular segment of the hole extends into the groove with the height of the circular segment and a chord of the circular segment defines a width of the opening.

7. The set of panels according to claim 1, wherein, in the locking position, the part of the locking surface extends through the opening into the groove with a length that is 5-25% of the largest diameter of the cylinder.

8. The set of panels according to claim 7, wherein the length in the radial direction of the cylinder that the part of the locking surface extends into the groove in the locking position substantially corresponds to the height of the circular segment.

9. The set of panels according to claim 7, wherein the length of the part of the locking surface that extends into the groove through the opening is configured to gradually increase when the locking device is moved from the mounting position to the locking position.

10. The set of panels according to claim 1, wherein, in the mounting position, the cylinder does not extend through the opening into the groove.

11. The set of panels according to claim 1, wherein the locking surface of the cylinder comprise one or more ridges.

12. The set of panels according to claim 11, wherein the one or more ridges extend around at least a part of a circumference of the locking surface.

13. The set of panels according to claim 11, wherein a height of the one or more ridges varies along its extension.

14. The set of panels according to claim 11, wherein the one or more ridges has a helical shape configured to press the adjacent panel downwards when moving the locking device from the mounting position to the locking position.

15. The set of panels according to claim 1, wherein the adjacent panel comprise a second hole that is configured to be arranged at the opening and to interact with the cylinder to lock the adjacent panel to the panel.

16. The set of panels according to claim 15, wherein the locking surface of the cylinder comprise at least one ridge that, in the locking position, is configured to be arranged at least partly in the second hole.

17. The set of panels according to claim 16, wherein an edge of the at least one ridge has an inclined surface that is configured to interact with a wall of the second hole to press the adjacent panel downwards into the groove of the panel.

18. The set of panels according to claim 1, wherein the locking device is configured to be moved between the mounting position and the locking position by turning the lever and the cylinder between 30°-180°.

19. The set of panels according to claim 1, wherein the panel and the adjacent panel is one of a bottom piece of a drawer, a frame and a back piece of a furniture product.

20. A method for assembly of a set of panels in accordance to claim 1, comprising the step of:
  a) inserting the cylinder of the locking device into the hole of the panel,
  b) turning the lever of the locking device to position the locking device in the mounting position,
  c) inserting the first edge of the adjacent panel into the groove of the panel, and
  d) turning the lever in a first direction to move the locking device from the mounting position to the locking position to lock the first edge of the adjacent panel in the groove.

21. The method according to claim 20, the method comprise the further steps of
  e) turning the lever in a second direction to move the locking device from the locking position to the mounting position to unlock the first edge of the adjacent panel in the groove, and f) removing the first edge of the adjacent panel from the groove of the panel.

22. A set of panels comprising a panel and an adjacent panel, wherein
the panel comprises a groove and at least one hole connected to the groove via an opening,
the adjacent panel comprises a first edge that is configured to be arranged in the groove of the panel, and
the panel comprises a locking device configured to lock the first edge of the adjacent panel in the groove of the panel, wherein
the locking device comprises a cylinder and a lever connected to the cylinder,
the cylinder is configured to be arranged in the hole in the panel,
the cylinder is an eccentric cylinder comprising a top and bottom base and a locking surface connecting the top and bottom base,
the cylinder is configured to act as a cam when the cylinder is turned about an axis in the hole,
the lever is configured to, when turned, turn the cylinder about the axis between a mounting position and a locking position, wherein
in the mounting position, the first edge of the adjacent panel is configured to be arranged in the groove of the panel, and
in the locking position, a part of the locking surface of the locking device extends into the groove through the opening and locks the adjacent panel in the groove, and
wherein the lever is connected to the cylinder at an inner end and at an outer end comprises a lock pin that, in the locking position, is configured to be arranged in the groove at a distance from the hole to lock the lever from turning from the locking position towards the mounting position.

23. The set of panels according to claim 22, wherein the locking device is configured such that the outer end of the lever is, in the mounting position, arranged at a distance from the adjacent panel and in the locking position adjacent with the adjacent panel.

24. The set of panels according to claim 22, wherein the locking device is configured such that the lever extends, in the mounting position, within the range of about 70° to about 110° from the adjacent panel.

25. A locking device configured to lock a first edge of an adjacent panel in a groove of a panel, the panel comprising at least one hole connected to the groove via an opening, wherein:
the locking device comprises a cylinder and a lever connected to the cylinder,
the cylinder is configured to be arranged in the hole in the panel,
the cylinder is an eccentric cylinder comprising a top and bottom base and a locking surface connecting the top and bottom base, the cylinder being eccentric along an entire length of the cylinder from the top base to the bottom base,
the cylinder is configured to act as a cam when the cylinder is turned about an axis in the hole,
the lever is configured to, when turned, turn the cylinder about the axis between a mounting position and a locking position,
in the mounting position, the first edge of the adjacent panel is configured to be arranged in the groove of the panel, and
in the locking position, a part of the locking surface of the locking device extends into the groove through the opening and locks the adjacent panel in the groove.

* * * * *